United States Patent

[11] 3,553,359

[72] Inventors Paul H. Dixon
Belvidere;
Burns Darsie; Jerry M. Zilka, Rockford, Ill.

[21] Appl. No. 726,409
[22] Filed May 3, 1968
[45] Patented Jan. 5, 1971

[73] Assignee Dixon Automatic Tool, Inc.
Rockford, Ill.
a corporation of Illinois

[54] FACSIMILE TRANSMITTER
25 Claims, 37 Drawing Figs.

[52] U.S. Cl. .......... 178/7.1
[51] Int. Cl. .......... H04n 1/04
[50] Field of Search .......... 178/7.1E, 7.1, 7.2E, 7.6, 7.6X; 250/219, 219F, 219I, 234, 223, 223X

[56] References Cited

UNITED STATES PATENTS

| | | | |
|---|---|---|---|
| 2,587,145 | 2/1952 | Grib .......... | 178/7.1E |
| 2,778,873 | 1/1957 | Nyman .......... | 178/7.1 |
| 2,989,586 | 6/1961 | Beck et al. .......... | 178/7.1 |

*Primary Examiner*—Richard Murray
*Assistant Examiner*—Alfred H. Eddleman
*Attorney*—Wolfe, Hubbard, Leydig, Voit & Osann

ABSTRACT: A facsimile transmitter includes a pair of traveling scanners carried by a vertically shiftable head and alternately movable through an active or scanning stroke across a document to be reproduced as the document is fed continuously beneath the scanners. A light source carried on the head transmits a collimated beam of light toward the active scanner which directs the light downwardly onto the document to detect the shade value thereof, picks up the light reflected upwardly from the document and directs such light in a collimated beam to a photomultiplier operable to send to a reproducing recorder an electrical signal varying in proportion to changes in the intensity of the beam and the shade value of the document. At the completion of its scanning stroke, each scanner is shifted to an inactive position out of the light beam and is moved reversely through a return stroke while the other scanner is moved through a scanning stroke to direct the light from the source onto the document and then to the photomultiplier. By feeding the document beneath the scanners, documents of any length can be reproduced and, through the use of a vertically movable head, documents of various thicknesses can be reproduced. A pressure responsive actuating mechanism for lowering the head and specially constructed rollers for advancing the document insure uniform and straight line feeding of the document regardless of its thickness.

INVENTOR
Paul H. Dixon
Burns Darsie
Jerry M. Zilka
by Wolfe, Hubbard, Voit & Osann
ATTORNEY INVENTORS
Paul H. Dixon
Burns Darsie
Jerry M. Zilka
by Wolfe, Hubbard, Voit & Osann
ATTORNEYS INVENTOR
Paul H. Dixon
Burns Darsie
Jerry M. Zilka
by Wolfe, Hubbard, Voit & Osann
ATTORNEY INVENTOR
Paul H. Dixon
Burns Darsie
Jerry M. Zilka
by Wolfe, Hubbard, Voit & Osann
ATTORNEY Inventors
Paul H. Dixon
Burns Darsie
Jerry M. Zilka
by Wolfe, Hubbard, Voit & Osann
Attorneys INVENTORS
Paul H. Dixon
Burns Darsie
Jerry M. Zilka by Wolfe, Hubbard, Voit & Osann
ATTORNEYS INVENTOR
Paul H. Dixon
Burns Darsie
Jerry M. Zilka
by Wolfe, Hubbard, Voit & Osann
ATTORNEY INVENTOR
Paul H. Dixon
Burns Darsie
Jerry M. Zilka
by Wolfe, Hubbard, Voit & Osann
ATTORNEY INVENTOR
Paul H. Dixon
Burns Darsie
Jerry M. Zilka
by Wolfe, Hubbard, Voit & Osann
ATTORNEY INVENTOR
Paul H. Dixon
Burns Darsie
Jerry M. Zilka
by Wolfe, Hubbard, Voit & Osann
ATTORNEY INVENTOR
Paul H. Dixon
Burns Darsie
Jerry M. Zilka
by Wolfe, Hubbard, Voit & Osann
ATTORNEYS INVENTORS
Paul H. Dixon
Burns Darsie
Jerry M. Zilka
by Wolfe, Hubbard, Voit & Osann
ATTORNEYS INVENTOR
Paul H. Dixon
Burns Darsie
Jerry M. Zilka
by Wolfe, Hubbard, Voit & Osann
ATTORNEY INVENTORS
Paul H. Dixon
Burns Darsie
Jerry M. Zilka
by Wolfe, Hubbard, Voit & Osann
ATTORNEYS

FACSIMILE TRANSMITTER

BACKGROUND OF THE INVENTION

This invention relates to a facsimile transmitter of the type which includes a scanning mechanism movable across a document to be reproduced and operable to create a signal which varies in proportion to changes in the shading of the document. After suitable conversion, the signal usually is transmitted over telephone wires to a recorder which responds to the signal and produces a facsimile of the scanned document.

SUMMARY OF THE INVENTION

The present invention aims primarily to provide a new and improved and relatively inexpensive facsimile transmitter of the above character which is usable with presently existing recorders and which is capable of effecting the production of sharp and uniform copies from documents of any length and rigidity and of widely varying thicknesses while the printing on the documents is visible to the operator of the transmitter.

To promote sharp and uniform copies, the invention contemplates a novel scanning mechanism which receives a collimated beam of light of high intensity from an external light source, concentrates the light in a very small spot on the document as the latter is scanned line-by-line, picks up the light reflected from the document, and directs such light in a collimated beam to a light-to-signal transducer operable to produce a signal proportional to the intensity of the light reflected from the document. Because the light is transmitted to and from the scanning mechanism in collimated beams, the intensity of the beam directed to the transducer is changed only by changes in the shading of the document and is not affected to any appreciable extent by the position of the scanner relative to the light source or the transducer. With the light concentrated on the document in a small spot, the average intensity of the reflected beam is more nearly correlated with the true shade value of the scanned portion of the document and also is substantially unaffected by ambient light. Accordingly, the signal created by the transducer is a more nearly perfect representation of the shading of the document thus resulting in the production of copies of high quality.

The reproduction of a document of any length is accomplished by feeding the document past the scanning mechanism at the same time the document is being scanned thereby enabling the scanning of successive portions of the document regardless of its length and, preferably, the document is fed in a single plane with the printing facing upwardly to enable the scanning of stiff or rigid documents such as heavy cardboard and to enable the operator of the transmitter to view the printing on the documents. Advantageously, the document is fed continuously rather than intermittently so as to effect a more uniform advance of the document and thus avoid the possibility of the document being scanned unevenly. To enable continuous feeding of the document at a faster rate while insuring that the latter will be scanned uniformly and precisely and while keeping the transmitter compatible with presently existing recorders, the scanning mechanism is constructed in a unique manner and comprises a pair of traveling scanners alternately operable to scan the document and each carrying an optics arrangement for receiving and directing the light beam. As soon as the first scanner completes a scanning pass across the document, the second scanner begins a pass and directs the light beam onto the document during the time the first scanner is returning to a starting position to begin another pass. In this way, the copy may be fed and scanned continuously without any lost time as the scanners return and yet will be scanned line-by-line without danger of any lines either being unevenly skipped or overlapped. Such continuous scanning of the document makes the transmitter usable with available recorders.

In order to scan and reproduce documents of various thicknesses, the scanners are carried on a vertically movable head which may be raised and lowered to permit the insertion of the document beneath the scanners regardless of the thickness of the document. The head carries at least one pressure roller which coacts with a power driven feed roller to advance the document. In furtherance of the invention, the head is precisely counterbalanced and is lowered in such a manner that an optimum amount of pressure is applied automatically to the document by the pressure roller to help effect uniform and straight line feeding of the document irrespective of its thickness.

In more detailed aspects, the invention resides in a novel actuating mechanism for traversing the scanners alternately across the document; in the unique construction of the pressure roller to effect straight line feeding of the document and to accommodate simultaneous side-by-side feeding of two or more documents of different thicknesses; and in a new and improved optics system for insuring that the light beam transmitted to the light-to-signal transducer is precisely characteristic of the shading of the document.

Other objects and advantages of the invention will become apparent from the following detailed description taken in conjunction with the accompanying drawing.

DESCRIPTION OF THE PREFERRED EMBODIMENT

Figures 1, 2:
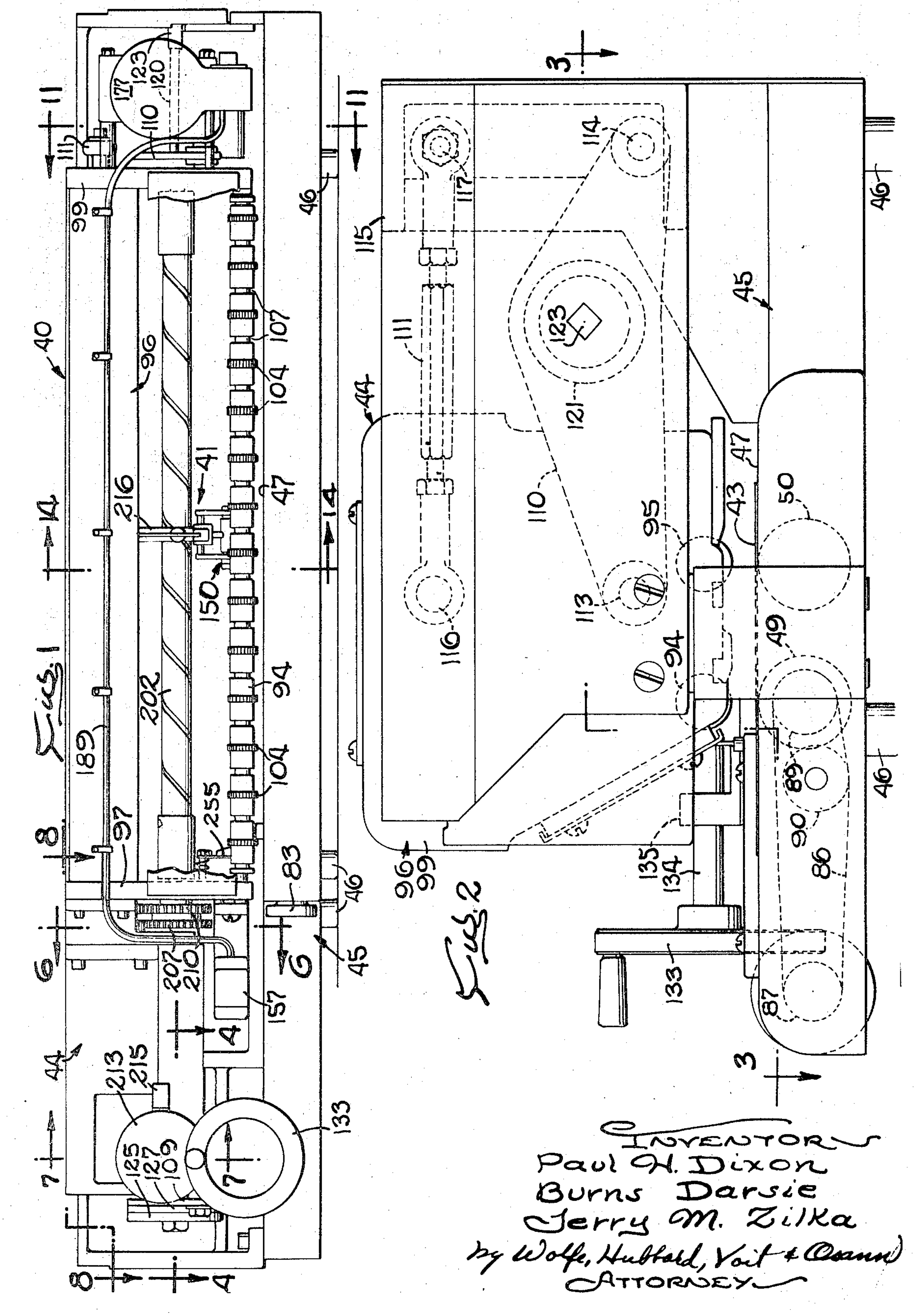
FIG. 1 is a front elevation of a new and improved facsimile transmitter embodying the novel features of the present invention.
FIG. 2 is an enlarged end view of the transmitter as viewed from the right of FIG. 1.

As shown in the drawings for purposes of illustration, the invention is embodied in a facsimile transmitter 40 having a scanning mechanism 41 movable across a document 43 (FIGS. 2 and 15) to be reproduced and operable to detect changes in the shading of any pictures or printed matter contained on the face of the document. As an incident to such detection, an electrical signal is produced which varies in accordance with changes in the shade value of the different areas of the document. The signal usually is transmitted over long distances by one or more telephone lines to a recorder (not shown) which operates to print a facsimile of the scanned document tin response to receiving the signal. A recorder especially suitable for use in conjunction with the present transmitter is disclosed in the copending application of Paul H. Dixon, et al. Ser. No. 739,767 , Filed June 25, 1968.

In this instance, the transmitter 40 includes a frame with a head 44 which supports the scanning mechanism 41 and which is suspended above a base 45 mounted on short legs 46 and formed with a generally flat top surface 47 upon which the document 43 is placed. As illustrated, the transmitter is capable of use in conjunction with documents up to 18 inches wide and, in accordance with one aspect of the invention, may be used to effect the reproduction of documents of any given length or of any rigidity. For this purpose, each document is fed lengthwise beneath the scanning mechanism in a generally horizontal plane from the front of the base toward the rear of the base at the same time the scanning mechanism traverses across the document from left to right (FIG. 1) to scan the document line-by-line. Thus, a document with one dimension greater than 18 inches may be placed on the base with its short dimension extending from left to right (FIG. 1) and then may be fed from front to rear beneath the scanning mechanism for as long a period as is necessary to scan the entire length of the document. By thus feeding the document past the scanning mechanism, the transmitter is not limited as to the length of document which may be handled, but instead, is capable of effecting the reproduction of documents of any indeterminate length. By feeding the document in a single horizontal plane, stiff documents made of cardboard, wood or even metal may be reproduced.

Advantageously, the document 43 is advanced and scanned with the image to be copied facing upwardly thus enabling the operator of the transmitter 40 to determine what portion of the document is being scanned and to stop the transmitter at the proper time if its is necessary that only part of the document be reproduced. Also, scanning and feeding the document with the image facing upwardly facilitates initial loading of the document into the transmitter.

Figure 3:
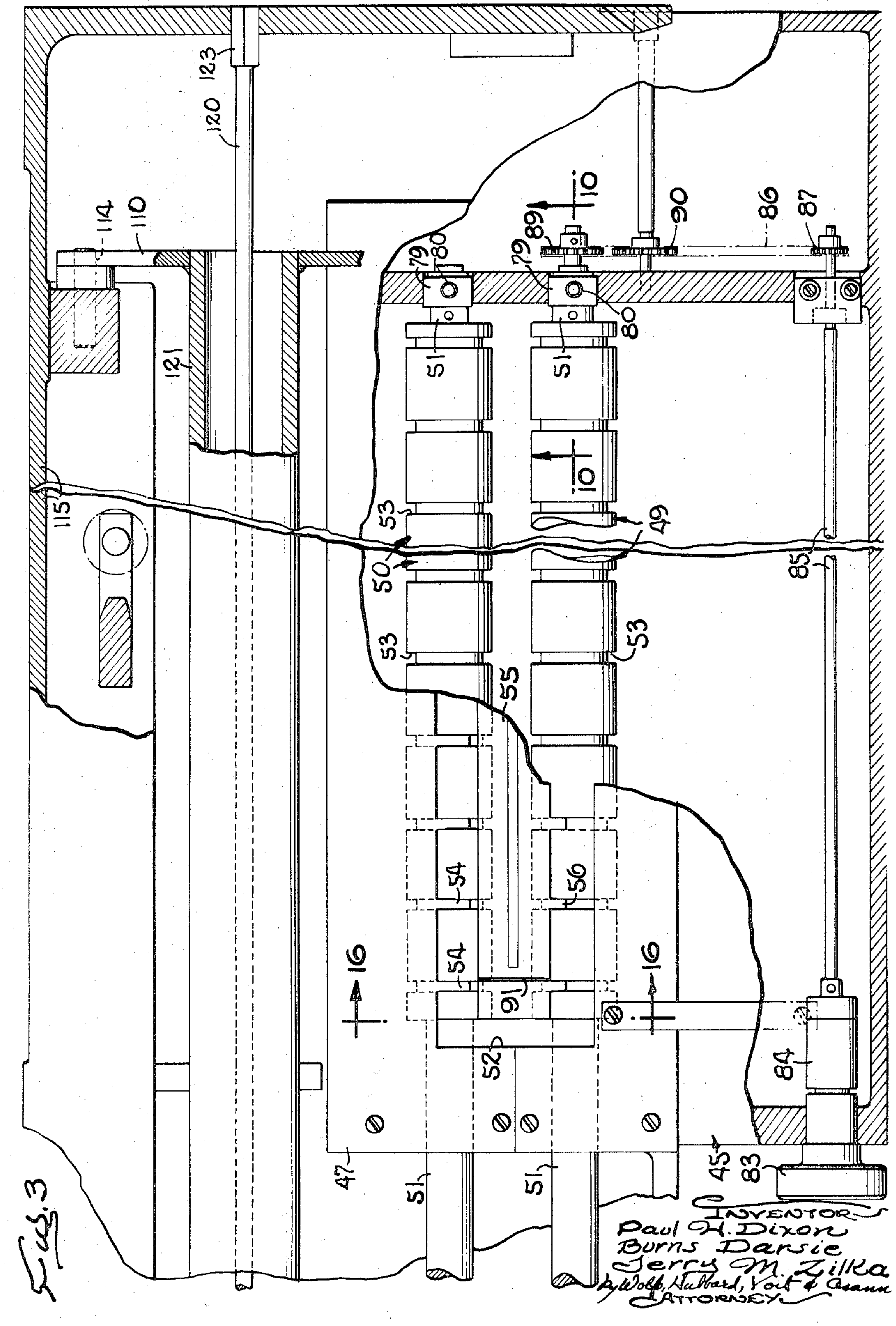
FIG. 3 is an enlarged fragmentary cross section taken substantially along the line 3–3 of FIG. 2.

To feed the document 43 past the scanning mechanism 41, two elongated feed rollers 49 and 50 (FIG. 3) with end trunnions 51 are journaled in the base 45 and are power-rotated to advance the document across the top surface 47 of the base. The two rollers extend parallel to one another and are located in the base with their upper surfaces disposed substantially level with the top surface 47 and exposed by an opening 52 formed in the top surface so that the rollers may engage the document. Each roller is made of relatively soft rubber and is formed with a series of axially spaced and circumferentially extending grooves 53. The document passes onto the roller 49 across a ledge 54[a] (FIG. 14) located along the forward side of the opening 52 and, in being fed from one roller to the other, passes across a supporting anvil 55 formed with forwardly extending fingers 56 which project into the grooves in the roller 49 to help guide the document, the anvil being mounted on the base for vertical adjustment to enable setting of its upper surface in the same plane as the top surface 47 of the base. Fingers 54 extending forwardly from the top surface 47 adjacent the rear edge of the opening 52 project into the grooves 53 in the roller 50 to guide the document off of the rollers.

Figures 4, 5:
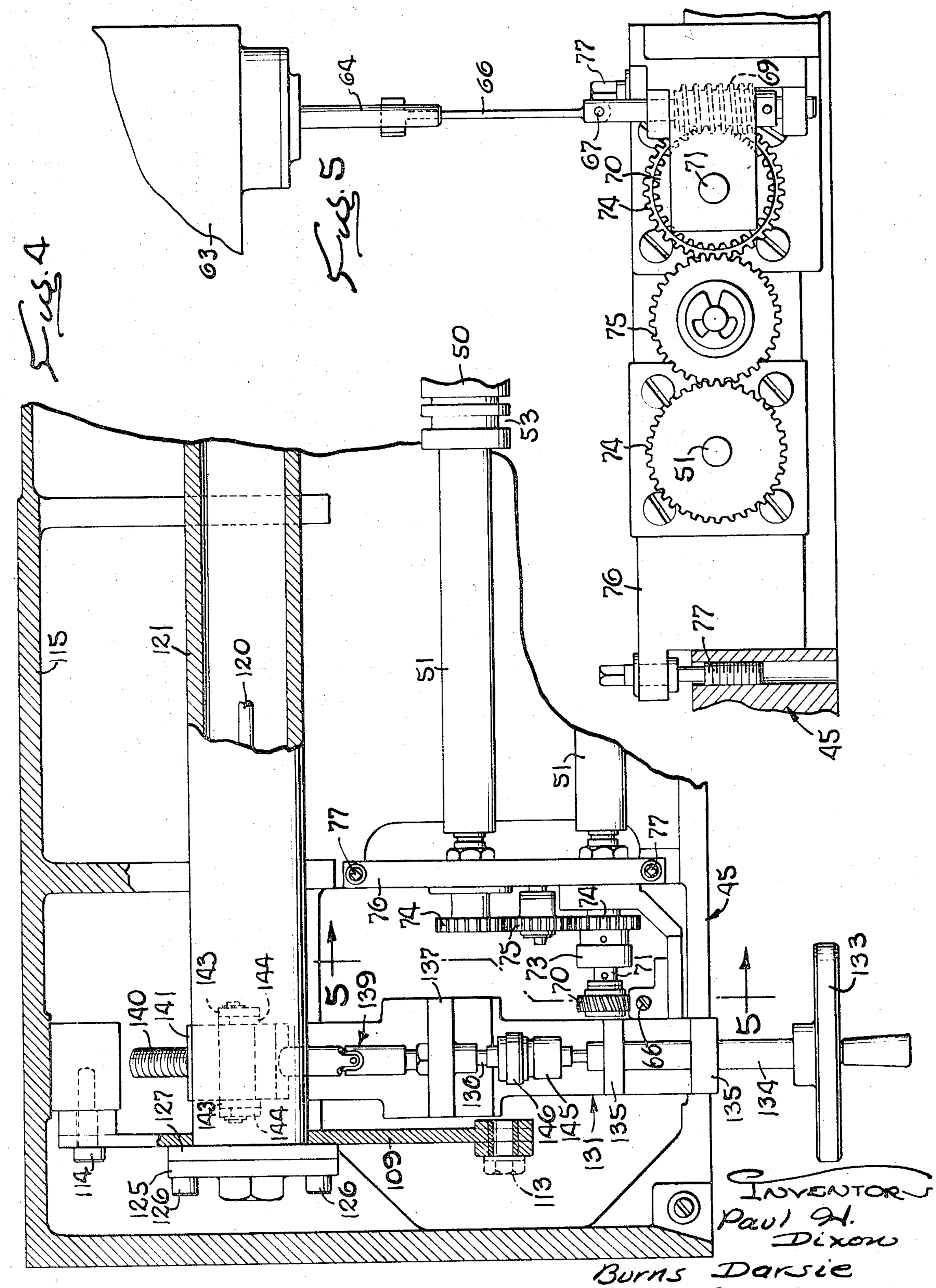
FIG. 4 is an enlarged fragmentary cross section taken substantially along the line 4–4 of FIG. 1.
FIG. 5 is an enlarged fragmentary cross section taken substantially along the line 5–5 of FIG. 4.
Figure 6:
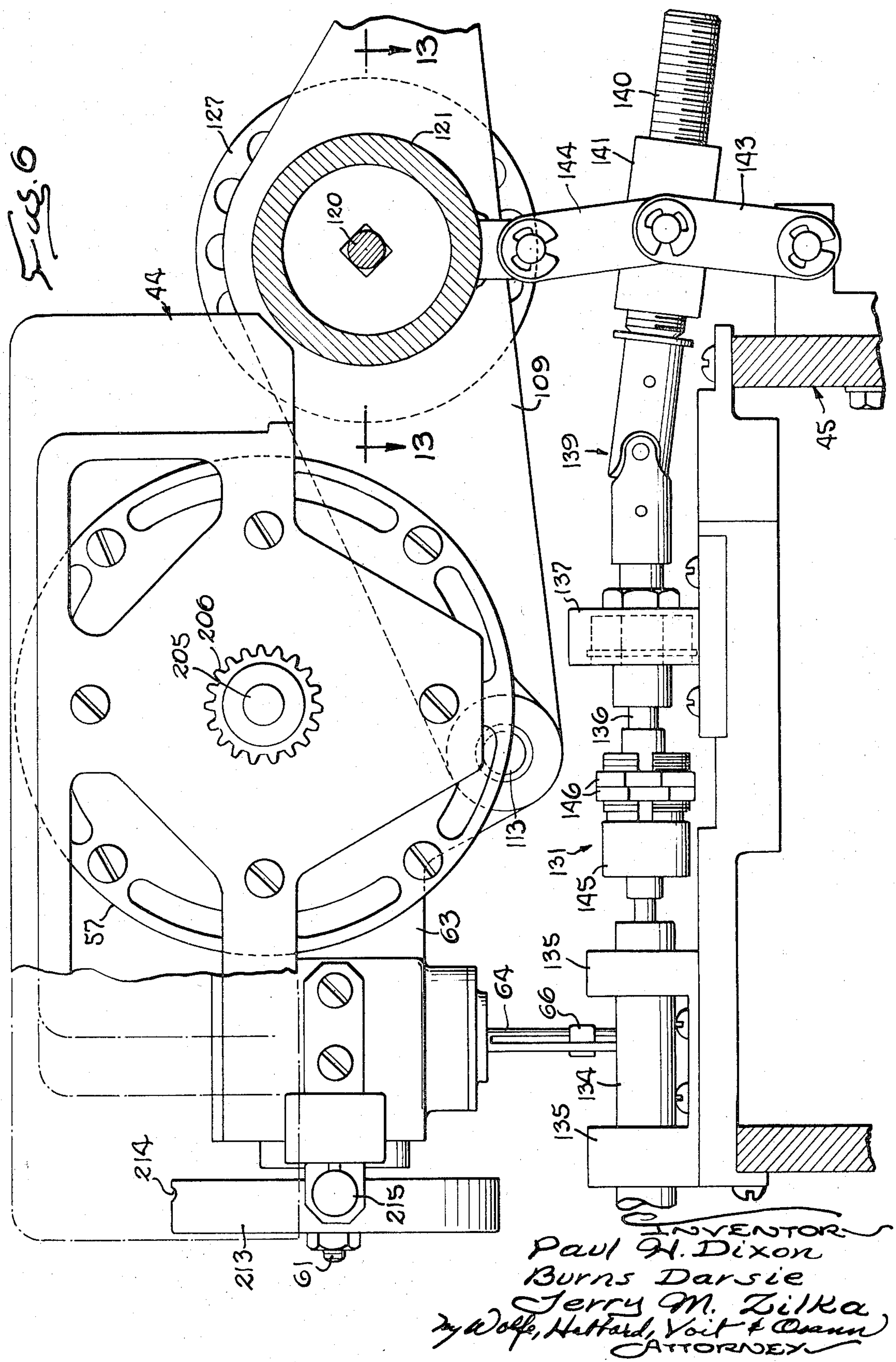
FIG. 6 is an enlarged fragmentary cross section taken substantially along the line 6–6 of FIG. 1.

In order to rotate the rollers 49 and 50, an electric motor 57 (FIGS. 6, 7 and 8) carried near the left end of the head 44 includes a drive shaft 59 (FIG. 7) connected by gearing 60 to an intermediate shaft 61 housed within a gear box 63 mounted adjacent the motor. A downwardly extending shaft 64 is coupled at its upper end to the intermediate shaft 61 by gearing 65 and is connected slidably at its lower end to a further shaft 66 journaled on the base 45 and pivoted intermediate its ends as indicated at 67 in FIG. 5. The pivot 67 and the sliding connection between the shafts 64 and 66 permit raising and lowering of the head and the motor relative to the base (as will be described below) while still maintaining a drive coupling from the motor to the shaft 66 journaled in the base.

Figure 10:
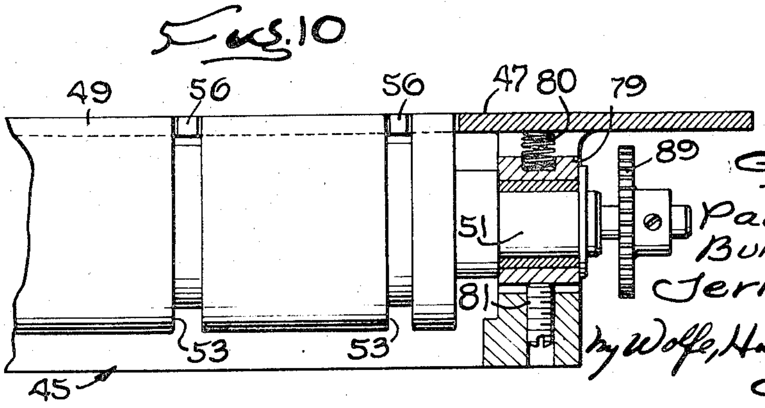
FIG. 10 is a fragmentary cross section taken substantially along the line 10–10 of FIG. 3.

Carried on the lower end portion of the shaft 66 is a worm 69 (FIG. 5) which drives a worm gear 70 (FIGS. 4 and 5) on a stub shaft 71 coupled to the left trunnion 51 of the front feed roller 49 through a one-way clutch 73. Thus, turning of the shaft 66 by the motor 57 results in rotation of the feed roller 49 through the gears 69 and 70. Rotative drive is transmitted to the feed roller 50 by pinions 74 fast on the left trunnions of the rollers and positioned on opposite sides of an idler gear 75. The left roller trunnions are journaled in and the gears 69, 70, 74 and 75 are carried by an end supporting member 76 (FIG. 5) which may be raised and lowered relative to the base by adjusting screws 77 to enable precise vertical positioning of the feed rollers relative to the top surface 47 and the center anvil 55. As shown most clearly in FIG. 10, the right trunnion of each feed roller is journaled in a bearing 79 which is supported on the base 45 for vertical adjustment and which is pressed by a compression spring 80 against a set screw 81 that may be tightened or loosened to raise and lower the bearing and the right end of the roller. As a result of the adjusting screws 77 and the set screws 81, the rollers may be aligned precisely with one another and with the anvil.

Figure 17:
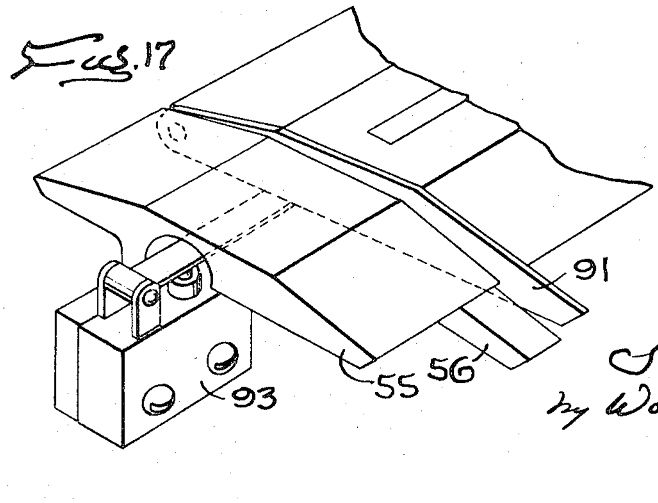
FIG. 17 is an enlarged fragmentary perspective view of parts shown in FIG. 16.

Before the document 43 is advanced by the feed rollers 49 and 50, it is fed manually to a predetermined starting position with its leading edge located on the anvil 55. Herein, such manual feeding is effected by a rotatable hand knob 83 (FIG. 3) journaled in one wall of the base 45 and connected by a one-way clutch 84 to a shaft 85. The latter is connected to the feed roller 49 by an endless chain 86 which is trained around sprockets 87 and 89 fast on the right end of the shaft 87 and the right trunnion 51 of the feed roller 49, respectively, with an idler sprocket 90 located intermediate the two sprockets to keep tension on the chain. When the knob 83 is rotated counterclockwise (as viewed from the left in FIG. 3) the feed rollers 49, 50 are turned in a direction to advance the document across the top surface 47 from front to rear and onto the anvil 55. Upon moving onto the anvil, the leading edge of the document depresses a pivoted switch operator 91 (FIG. 17) operable to close a document-in switch 93 which may be used to start the drive motor 57 and thereby initiate automatic feeding of the document.

Because of the one-way clutch 84, the hand knob 83 is not turned when the feed rollers 49 and 50 are power-driven through the gears 69 and 70 to feed the document 43 automatically. Also, the one-way clutch 73 disconnects the feed rollers from the gears while the rollers are being turned manually by the hand knob.

Cooperable with and biased toward the feed rollers 49 and 50 to advance the document 43 are two pressure rollers 94 and 95 (FIG. 14) carried by the head 44 and engageable with the upper side of the document to press the latter against the feed rollers and create sufficient friction to cause advancement of the document as the feed rollers are rotated. In this instance, the head is formed with an inverted boxlike enclosure 96 overhanging the base 45, and the pressure rollers are journaled rotatably in the left and right end walls 97, 99 of the enclosure near the open lower end thereof. The two pressure rollers extend parallel to each other and to the feed rollers and overlie the latter such that the document is pinched lightly between the two sets of rollers and thus is advanced by frictional engagement with the rotating rollers. Carried on the head between the two pressure rollers is an elongated hold-down plate 100 (FIG. 14) which is disposed just above the upper surface of the document in overlying relation with the anvil 55. A longitudinally extending slot 101 is formed through the plate and supports along its lower edge a thin strip 103 of yieldable plastic which presses lightly against the upper side of the document. When relatively flimsy documents such as thin paper or onionskin sheets are being fed beneath the plate, the plastic strip keeps the document pressed flat against the anvil and prevents the document from buckling or curling upwardly into the slot.

The pressure rollers 94 and 95 are constructed in a novel manner to effect straight and uniform feeding of the document 43, to accommodate any variations in the thickness of the document, and to enable the simultaneous side-by-side feeding of two or more documents of different thicknesses. To these ends, sets of fingers 104 (FIG. 15) made of resiliently yieldable material project radially from the peripheral surface of each pressure roller and individually flex upon engaging the document so as to conform to any variations in the thickness of the document to accommodate any unequal forces applied to the rollers without seriously distorting the overall diameters of the rollers and causing skewing of the document as it is fed past the scanning mechanism 41.

Figure 14:
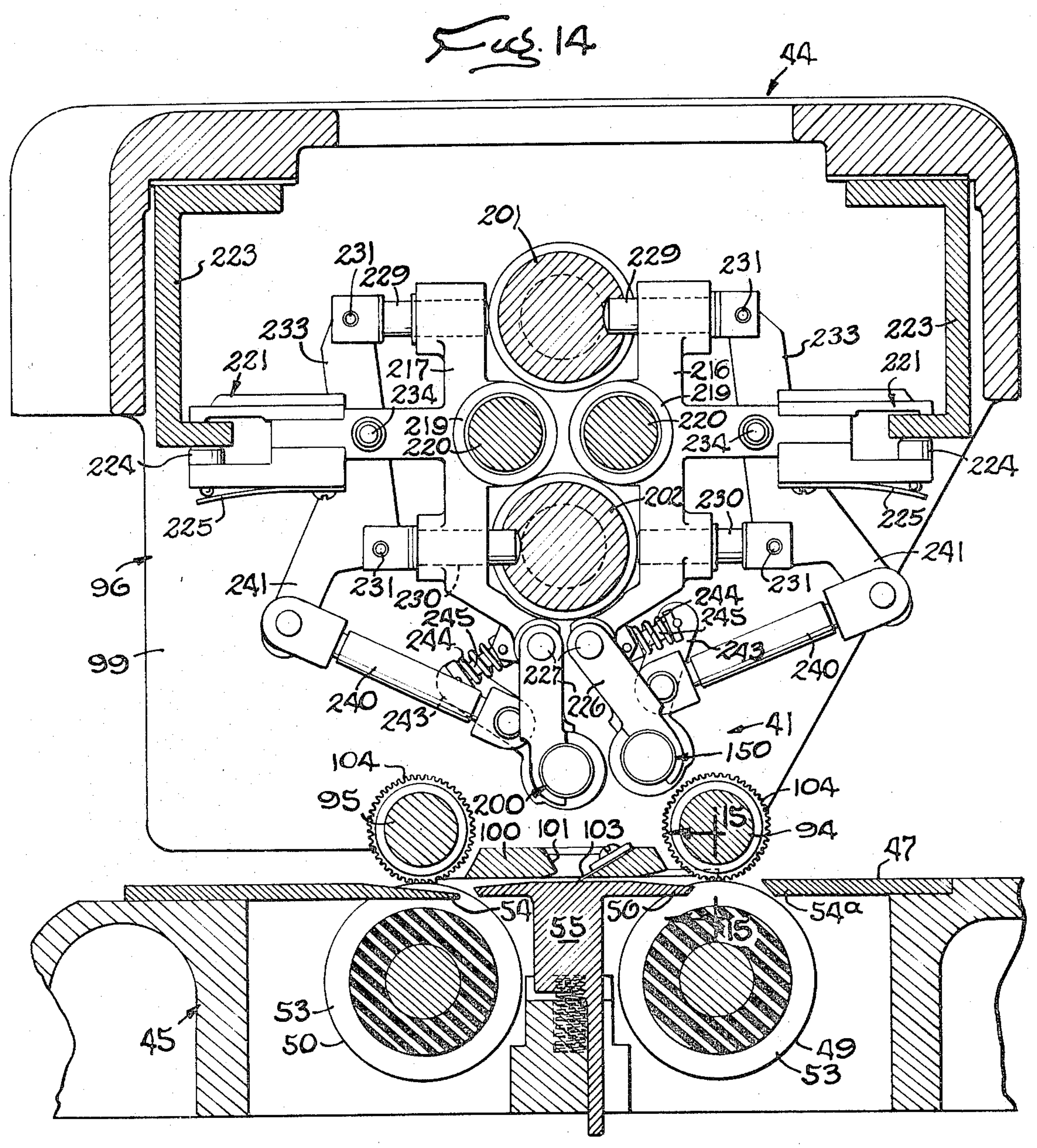
FIG. 14 is an enlarged fragmentary cross section taken substantially along the line 14–14 of FIG. 1.
Figure 15:
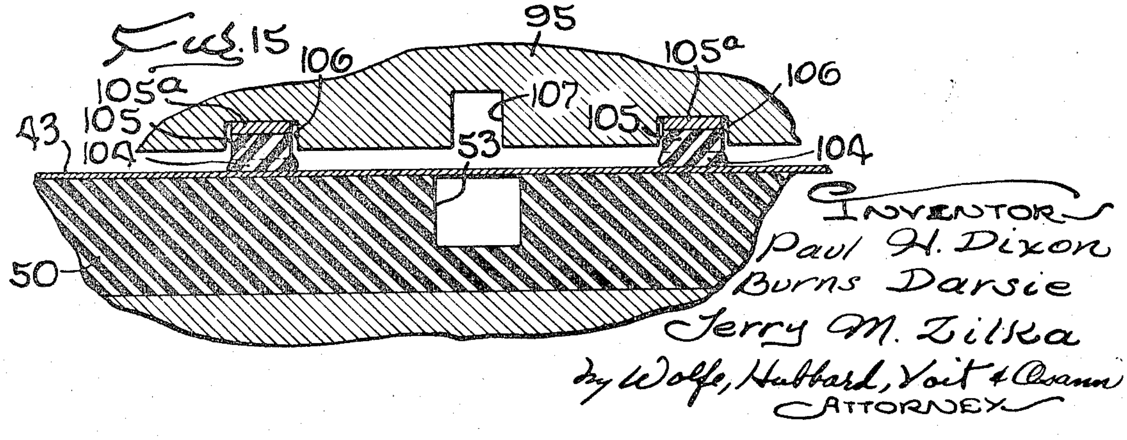
FIG. 15 is an enlarged fragmentary cross section taken substantially along the line 15–15 of FIG. 14.

As shown most clearly in FIGS. 14 and 15, each finger 104 is made of yieldable rubber with the fingers of each set projecting radially from an endless band or ring 105, the fingers being spaced circumferentially around the ring. The rings are journaled loosely on bushings 105$^a$ of Teflon or the like fitted into axially spaced grooves 106 formed around the cylindrical outer surfaces of the pressure rollers 94 and 95 which herein are made of steel. The yieldable fingers 104 on each roller press lightly against the document and flex independently of one another toward the surface of the roller so that, if one part of the document is thicker than the other parts, those fingers overlying the thicker part may yield to accommodate the greater thickness without distorting or flattening out the remainder of the the roller and causing a substantial length of the roller to assume a smaller diameter. As a result, the effective diameter of each roller over its entire length remains more nearly uniform to cause a true straight line feeding of the document and to avoid skewing of the document as otherwise might occur if deformation of one part of the roller were transmitted to other parts of the roller to create substantial variations in the diameter of the roller. With the fingers individually flexible, two documents varying in thickness as much as .01 of an inch may be fed through the rollers at the same time without either document slipping or moving in a skewed path. Moreover, the fingers 104 will yield without flattening an entire section of the roller if the biasing pressure applied to each roller 94, 95 is not distributed uniformly along its entire length or if such roller is not disposed in a precisely horizontal position parallel to the rollers 49 and 50. Since the rings 105 are mounted loosely on the bushings 105$^a$, the fingers may brush lightly across the document and are free to slip or walk around the rotating rollers 94, 95 in case one set of fingers is flexed or compressed to a greater extent than the other set. Accordingly, the tendency of the various sets of fingers to exert unequal compressive forces on the document is reduced.

In accordance with another aspect of the invention, the head 44 is mounted for selective up and down movement between lowered and raised positions relative to the base 45 to vary the vertical spacing between the pressure rollers 94 and 95 and the feed rollers 49 and 50 and thereby enable the feeding between the rollers and beneath the scanning mechanism 41 of either relatively thin documents such as onionskin or tissue paper or of relatively thick documents such as an open book or magazine or even a rigid board having printing or pictures on one side. Thus, the transmitter 40 may be used to effect the reproduction of documents of various thicknesses.

Figures 7, 8:
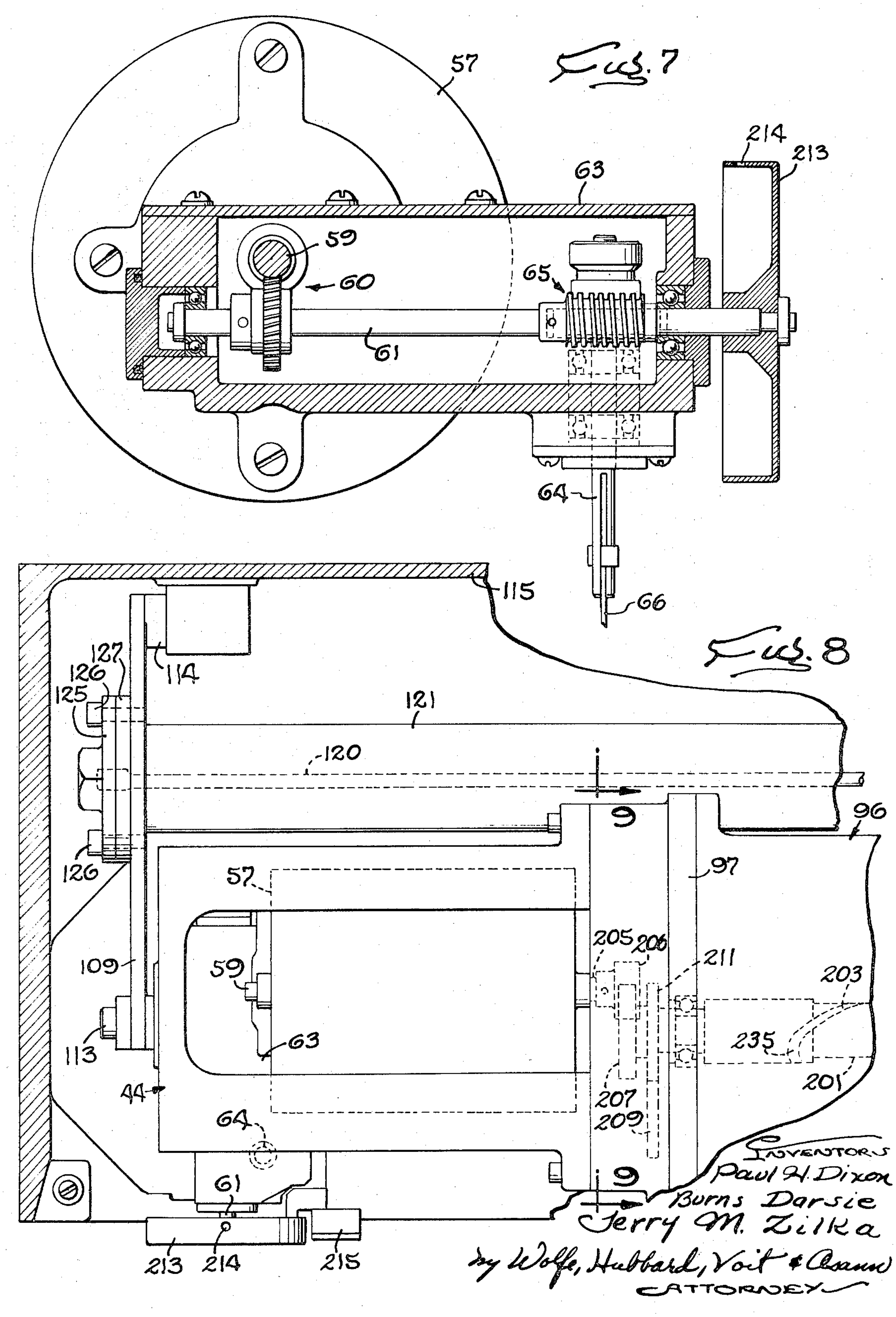
FIG. 7 is an enlarged fragmentary cross section taken substantially along the line 7–7 of FIG. 1.
FIG. 8 is an enlarged fragmentary cross section taken substantially along the line 8–8 of FIG. 1.
Figure 11:
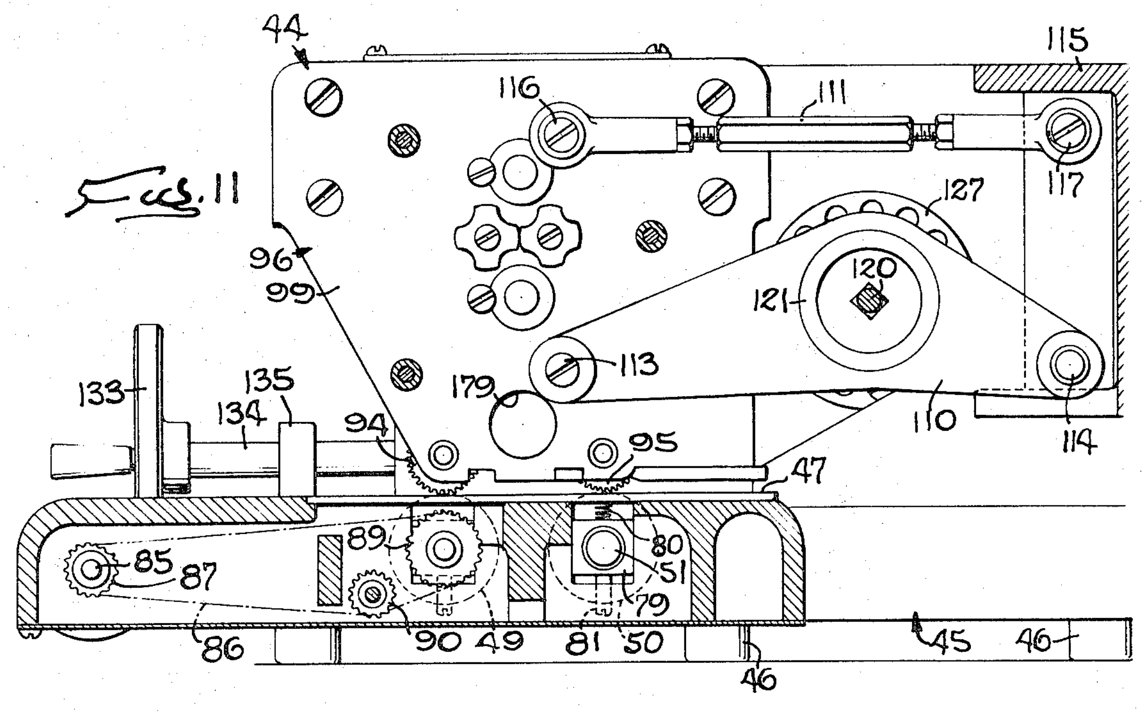
FIG. 11 is an enlarged fragmentary cross section taken substantially along the line 11–11 of FIG. 1.
Figures 12, 13:
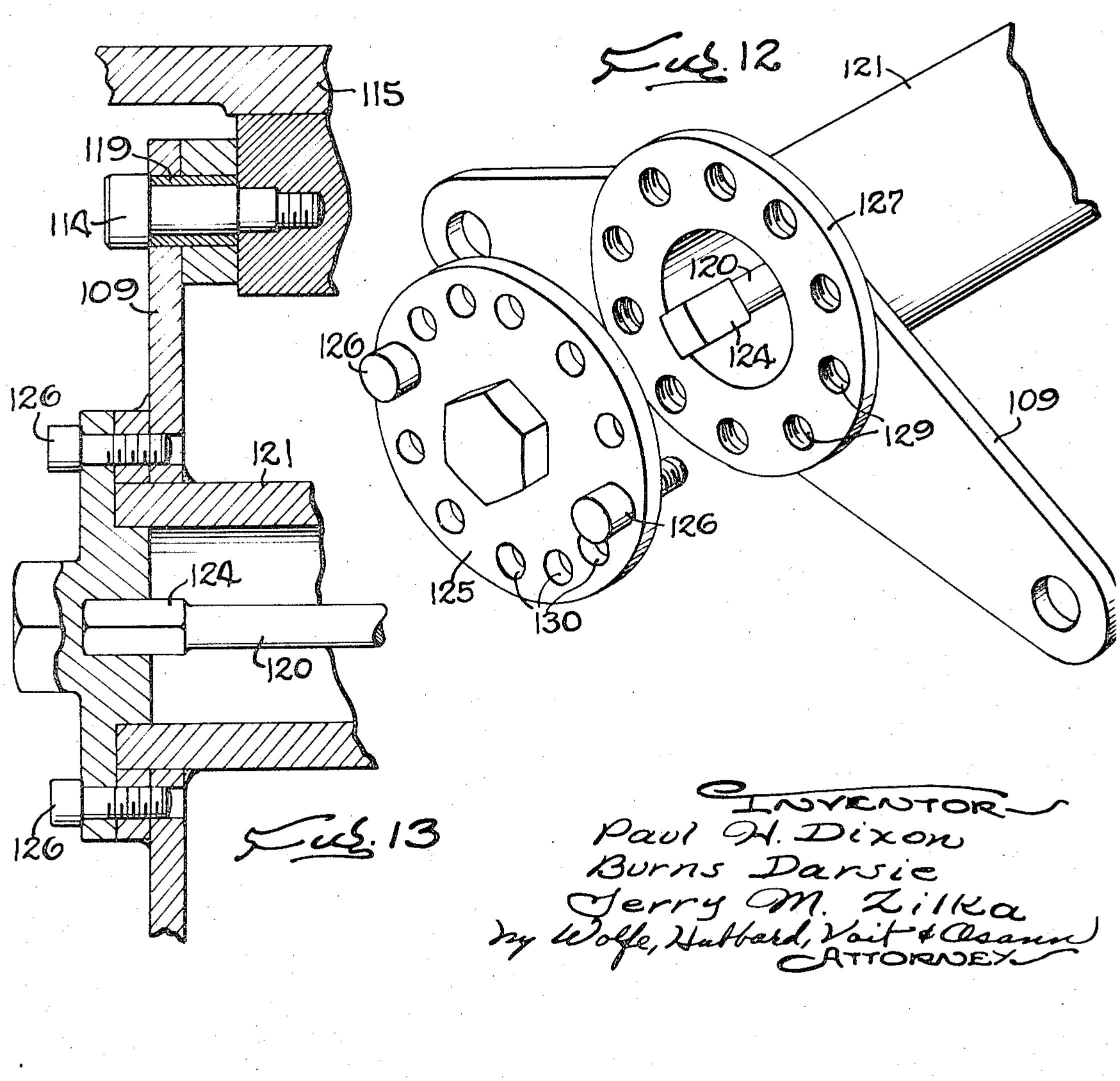
FIG. 12 is an enlarged exploded perspective view of parts shown in FIGS. 4 and 6.
FIG. 13 is an enlarged fragmentary cross section taken substantially along the line 13–13 of FIG. 6.

Herein, the head 44 is suspended above the base 45 by three pivoted arms 109, 110 and 111 which form a parallelogram linkage causing the head to move straight up and down relative to the base without any tilting during the raising and lowering movement. As shown in FIGS. 8 and 11, the arms 109 and 110 are pivoted at their forward ends near opposite ends of the head as indicated at 113 and are connected pivotally at their rear ends as indicated at 114 to a stationary support member 115 upstanding from the rear of the base. The arm 111 (FIG. 11) extends horizontally between the upper part of the head and the upper part of the support member in overlying relation with the arm 110 adjacent the right end wall 99 of the head enclosure 96, and is pivoted to the head and the support member at 116 and 117, respectively. The upper arm 111 extends parallel to the lower arm 110, and the corresponding pivots of the two arms are aligned vertically with one another such that the head moves straight up and down as it is raised and lowered. Suitable bushings such as that indicated by the reference numeral 119 in FIG. 13 are located at the various pivots to reduce frictional drag occurring during movement of the head.

To advantage, the head 44 is precisely counterbalanced to facilitate its raising and lowering and to assist in maintaining optimum pressure on the document 43 regardless of the elevation of the head. Such counterbalancing is achieved through the use of a torsion bar 120 (FIGS. 3 and 4) made of spring metal and extending along the rear side of the head parallel to the pressure rollers 94 and 95. The torsion bar extends through an enlarged tube 121 welded at opposite ends to the arms 109 and 110. At its right end, the torsion bar formed with a squared section 123 (FIG. 3) which is anchored rigidly to part of the support member 115 so as to remain stationary when the head is raised and lowered. The left end of the bar terminates adjacent the corresponding end of the tube 121 and is formed with a squared section 124 (FIGS. 12 and 13) which fits nonrotatably into a similarly shaped hole formed in an end cap 125 adapted to be secured releasably by two fasteners or screws 126 to an enlarged flange 127 rigid with and encircling the end of the tube. To counterbalance the head, the end cap 125 is rotated clockwise (FIG. 12) relative to the flange to twist the bar about its own axis thus causing the bar to wind up and exert an upward force tending to raise the head upwardly away from the base 45. After the bar has been twisted through a sufficient angle to exert a force substantially equal to that resulting from the weight of the head, the end cap is anchored to the flange by the screws to lock the bar in its loaded condition.

Unusually, the torsion bar 120 is twisted until the head 44 in effect is substantially weightless and will remain at any elevation to which it is placed. To permit twisting of the bar through an optimum angle to produce such weightlessness, a series of 10 circumferentially spaced holes 129 (FIG. 12) for receiving the screws 126 are formed in the flange 127 and, as the end cap 125 is turned, register at various times with different ones of a series of 12 equally spaced holes 130 formed in the end cap. With this relationship of an unequal number of holes in the flange and the end cap, at least two holes in each register with one another in every six degrees of angular movement of the end cap thus providing a vernierlike adjustment of the cap relative to the flange. Accordingly, the end cap may be rotated to the exact position necessary to apply the requisite twist in the torsion bar to balance the head, and then the screws may be threaded into the aligned pairs of holes to anchor the end cap and the bar in their adjusted angular positions.

Because of the counterbalancing effected by the torsion bar 120, the head 44 may be raised away from the base 45 with the exertion of only a small force on the head. In addition, the torsion bar helps keep the head balanced in a level position on the arms 109, 110 and 111 and, together with the tube 121, prevents the head from tilting or sagging in such a way that one end of the head is located higher than the other. With the head substantially weightless, the pressure exerted on the document 43 by the pressure rollers 94 and 95 may be controlled accurately and easily regardless of the elevation of the head and regardless of the thickness of the document as will become more apparent below.

Provision is made of a novel actuating mechanism 131 (FIGS. 4 and 6) for lowering the head 44 to insure the application of optimum pressure to the document 43 when the head is shifted downwardly to move the pressure rollers 94 and 95 into engagement with the document. In this instance, the actuating mechanism includes a hand crank 133 fast on the end of a shaft 134 journaled in bearings 135 located near the left end of the base 45, the hand crank being rotatable in one direction to raise the head and in the other direction to lower the head. The shaft 134 is connected to a second shaft 136 journaled in a bearing 137 and coupled by a universal joint 139 to a rotatable screw 140. Threaded onto the latter is a nut 141 to which are pivoted oppositely extending toggle links 143 and 144 connected pivotally to the base 45 and the tube 121, respectively. As the crank is rotated in one direction (clockwise as viewed in FIG. 1) to turn the screw, the nut moves rearwardly (FIG. 4) along the screw to draw the toggle links together and lower the head 44 toward the base 45. When the crank is turned in the opposite direction, the nut moves forwardly on the screw to straighten the toggle links and raise the head. With this arrangement, the head may be raised away from the base to permit placement of a document of considerable thickness between the pressure rollers 94 and 95 and the feed rollers 49 and 50, the head in this instance having a range of movement of approximately three-fourths of an inch to accommodate a document of corresponding thickness. Once the document is properly placed between the rollers, the head is lowered with the crank 133 to move the pressure rollers downwardly into engagement with the upper surface of the document and to press the document against the feed rollers.

Regardless of the thickness of the document 43, lowering of the head 44 is stopped automatically after the pressure rollers 94 and 95 have been moved downwardly against the document sufficiently far to exert pressure within a workable range which avoids both slippage and binding of the document. In this specific instance, this is achieved by connecting the actuator shaft 134 to the shaft 136 by means of an overload clutch 145 (FIG. 6) which is adapted to slip as soon as the resistance of the shaft 136 to turning reaches a preselected value thus indicating that the pressure rollers are pressing against the document with a predetermined force. Once the clutch slips, further downward movement of the head is stopped automatically even though the operator of the transmitter continues to rotate the hand crank 133 in a direction tending to lower the head. Accordingly, the clutch insures that the head will be stopped with the scanning mechanism 41 a predetermined distance above the document and that the head will not be lowered so far as to result in the exertion of such heavy pressure on the document as would restrict its smooth and uniform feeding.

The overload clutch 145, which may be of conventional construction, includes an adjusting mechanism 146 (FIG. 6) adapted to be set selectively to cause the clutch to slip when the shaft 136 is subjected to smaller or larger torsional forces. The ultimate pressure exerted on the document 43 thus may be adjusted to within an optimum range by changing the setting of the adjusting mechanism. One exemplary way of adjusting the pressure is to lower the head 44 toward the base 45 without a document between the two sets of rollers 49, 50 and 94, 95. The head starts meeting resistance to downward movement and a load is imposed on the shaft 136 shortly after the yieldable fingers 104 engage the feed rollers 49, 50 and begin deflecting. Downward movement of the head is continued until the fingers have deflected sufficiently far to leave a preestablished amount of vertical clearance (e.g. .010 inch——.012 inch) between the peripheral surfaces of the feed rollers and the smooth peripheral surfaces of the pressure rollers. The clutch adjusting mechanism 146 then is set to cause the clutch to slip at the load imposed on the shaft 136 with such clearance existing between the rollers. When the head is subsequently raised and then lowered with a document inserted between the rollers, the clutch will slip to stop downward movement of the head when the same or substantially the same selected amount of clearance remains between the smooth surfaces of the pressure rollers and the upper face of the document irrespective of the thickness of the document. In this way, it is possible to establish an optimum pressure range for effecting slip-free feeding of any document with a thickness within a given range and without danger of the document binding or dragging because of excessive friction. Also, the scanning mechanism 41 always will be positioned substantially the same distance above the upper surface of the document regardless of its thickness.

From the foregoing, it will be apparent that the transmitter 40 is capable of effecting the reproduction of both extremely thin and relatively thick documents of any length and may be used in conjunction with documents which are rigid or stiff. Because the head 44 is counterbalanced, its weight does not significantly affect the pressure exerted on the document so that pressures within a workable range may be applied automatically to documents of various thicknesses without the need of using adjustable stops or the like to compensate for the weight of the head. Even though the head is counterbalanced, it is held firmly in all of its adjusted positions by the toggle links 143 and 144 and thus will not vibrate on the base 45 and cause shaking of the scanning mechanism 41 relative to the document 43.

According to another important aspect of the invention, the shading of the document 43 is detected and signaled in such a manner as to insure the production of sharp and uniform facsimiles which are substantially free from any imperfections that might result from a failure to detect and signal the true shade value of any portion of the document. In general, extremely precise and uniform detection of the shade value of each portion of the document is achieved through the use of a light source 147 (shown schematically in FIG. 32) operable to direct a collimated light beam 149 of high intensity along a horizontal path extending parallel to and above the upper face of the document and extending crosswise to the direction of movement of the document. The scanning mechanism 41 includes a scanner 150 movable from left to right across the document and located in the path to intercept the light beam from the source and to direct the light downwardly onto the face of the document as indicated at 151 in FIG. 32. Such downwardly directed light is focused in an extremely small spot 153 on the document and is reflected back upwardly toward the scanner 150 as indicated by the rays 154.

The intensity of the reflected light 154 varies in accordance with changes in the shade value of the document 43 and thus is indicative of the lightness or darkness of that portion of the document upon which the spot 153 is located at any given time. That is, the intensity of the reflected light 154 increases as lighter areas of the document are scanned by the spot 153 and decreases as the darker areas are scanned. Accordingly, as the scanner 150 makes a pass across the document, the intensity of the light 154 changes in proportion to the changes in the shading of that particular narrow line of the document scanned by the spot during such pass.

As the light 154 is reflected back upwardly from the document 43, it is picked up by the scanner 150 and is directed ahead of the scanner along its original horizontal path in a collimated beam 155 whose intensity, of course, also is representative of the shading of the document. The beam 155 is received by a light-to-signal transducer 156 (FIGS. 31 and 32) located adjacent the right end of the path and operable in response to detecting the beam to produce an electrical signal proportional to the intensity of the light. After conversion and amplification, the electrical signal is transmitted to the reproducing recorder which responds to the signal to create a facsimile of that portion 1 which of the document which was scanned to produce the signal.

Since the rays of the beam 149 directed from the light source 147 to the traveling scanner 150 are collimated or parallel, the size or cross-sectional area of the beam striking the scanner remains essentially the same regardless of the distance of the scanner from the light source. This insures that the size and intensity of the spot 153 will remain substantially constant as the scanner moves across the document. Also, since the rays of the beam 155 are collimated, the cross-sectional area of the beam as received by the light-to-signal transducer 156 is uniform irrespective of the distance of the scanner from the transducer. Thus, the beam detected by the transducer is precisely proportional to changes in the shading of the document and is not appreciably influenced by the physical position of the scanner.

Figure 27:
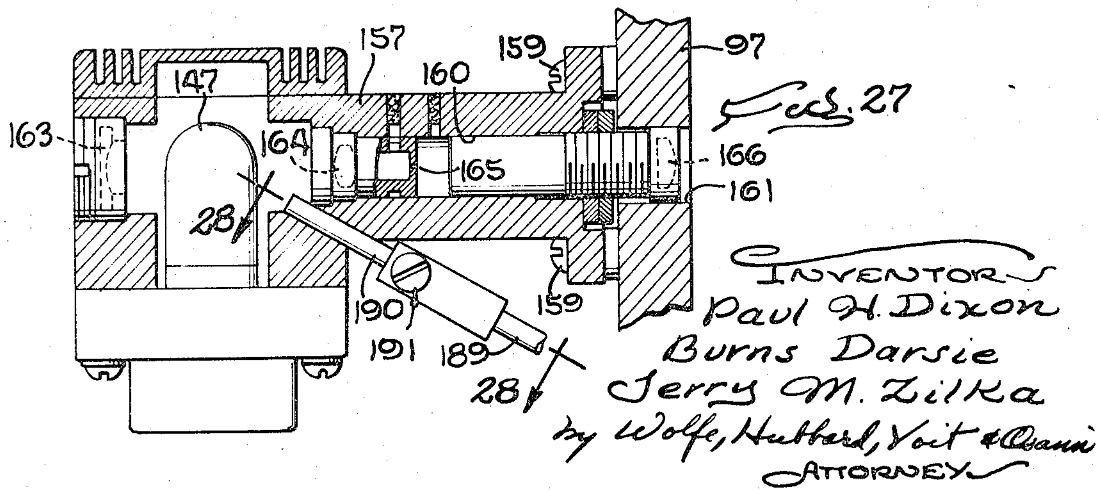
FIG. 27 is an enlarged fragmentary cross section taken substantially along the line 27–27 of FIG. 9.

More specifically, the light source 147 (FIGS. 27 and 32) is carried on the outer side of the left end wall 97 of the head enclosure 96 and takes the form of a standard electric lamp. A small 3 volt lamp such as that designated as No. 1874 by the General Electric Company is as large as is required for use with the present transmitter. The lamp 147 is enclosed within a housing 157 (FIG. 27) fastened to the end wall 97 by screws 159 and formed with a bore 160 which is aligned with a hole 161 extending through the end wall. Light emitted from the lamp and reflected from a concave mirror 163 located at the left side of the lamp is directed into the bore 160 and through a condensing lens 164 and an iris 165 located within the bore, the iris having an opening with a diameter of approximately .004 inches. Thereafter, the light passes through an optical lens 166 which is located within the hole 161 in the end wall to collimate the rays and direct the collimated beam 149 along a horizontal path toward the light-to-signal transducer 156.

The scanner 150 for receiving the light beam 149 comprises a generally cylindrical housing 167 (FIG. 29) formed with two centrally located and axially extending bores 169 and 170 disposed end-to-end. The light beam 149 is directed into the housing through an acromatic lens 171 located at one end of the bore 169, and then is reflected onto the document 43 in the downwardly directed rays 151 by a vertically inclined mirror 173 disposed at the other end of the bore. The mirror is positioned to direct the rays 151 downwardly through a window 174 in the lower side of the housing end and is focused to concentrate the light on the document in the small spot 153 which herein is only about .0035 inches in diameter. As pointed out above, the diameter of the spot remains substantially constant regardless of the distance of the scanner 150 from the lamp 147 since the rays of the beam 149 directed toward the scanner are collimated.

The light rays 154 reflected back upwardly toward the scanner 150 from the document 43 pass into the bore 170 through the window 174 in the housing 167 and are directed against an inclined mirror 175 located at one end of the bore 170. The light is reflected from the mirror to a lens 176 which is disposed at the other end of the bore to collimate the reflected rays of light and direct the resulting beam 155 ahead of the scanner toward the light-to-signal transducer 156.

Herein, the transducer 156 is mounted in a casing 177 (FIG. 31) on the outside of the right end wall 99 of the head enclosure 96 and comprises a photomultiplier tube such as a No. 8053 tube sold by The Radio Corporation of America. While a photomultiplier tube has been specifically illustrated, other types of photosensitive and electrical signaling devices may be used as, for example, a photovoltaic, a photocell, a photoresistive semiconductor, and similar devices for sensing the intensity of a light beam and producing an electrical signal proportional to such intensity.

Figures 28, 29, 30:
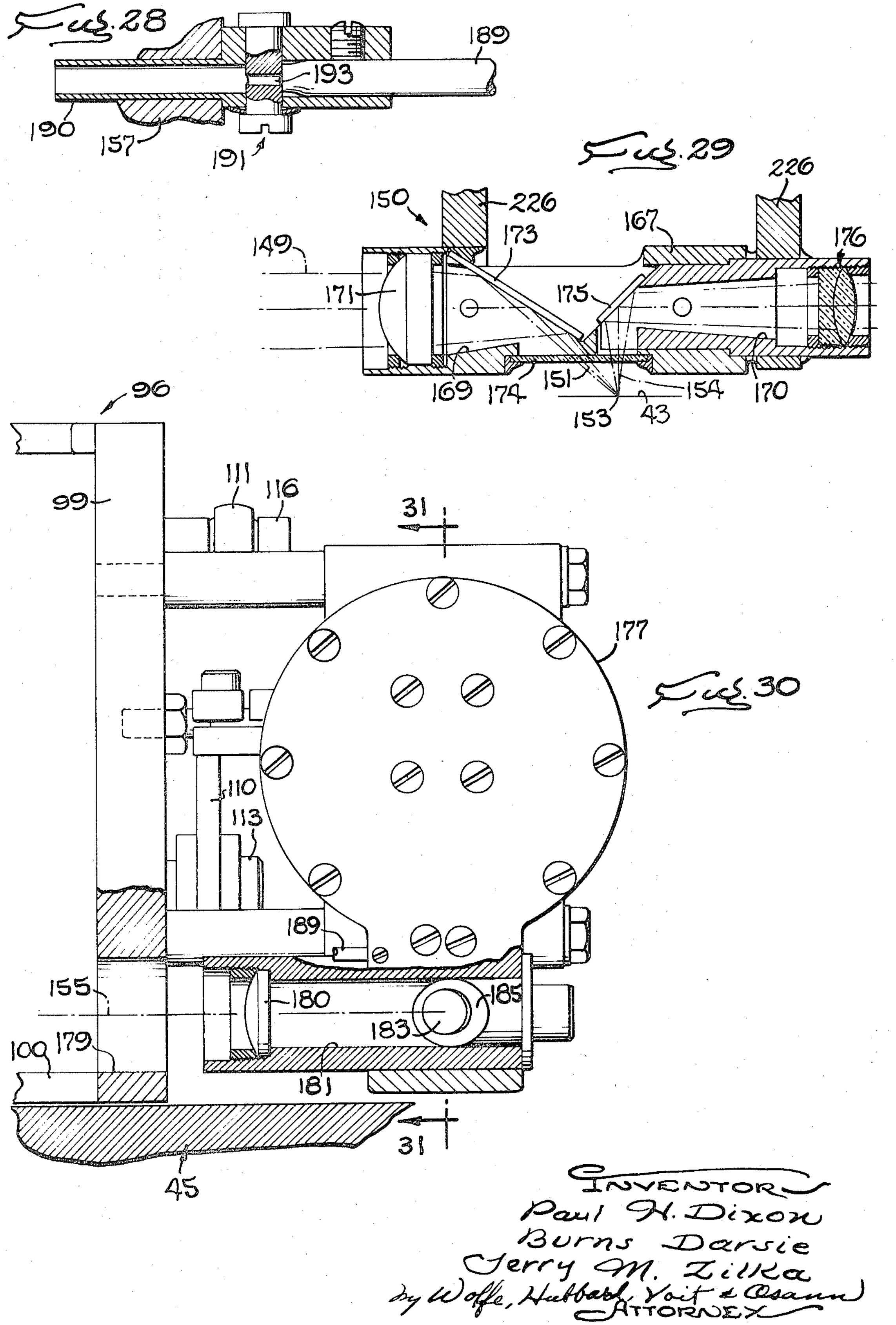
FIG. 28 is an enlarged fragmentary cross section taken substantially along the line 28–28 of FIG. 27.
FIG. 29 is an enlarged fragmentary cross section taken substantially along the line 29–29 of FIG. 16.
FIG. 30 is a fragmentary front elevation of the light-to-signal transducer with parts broken away and shown in section.
Figures 31, 32:
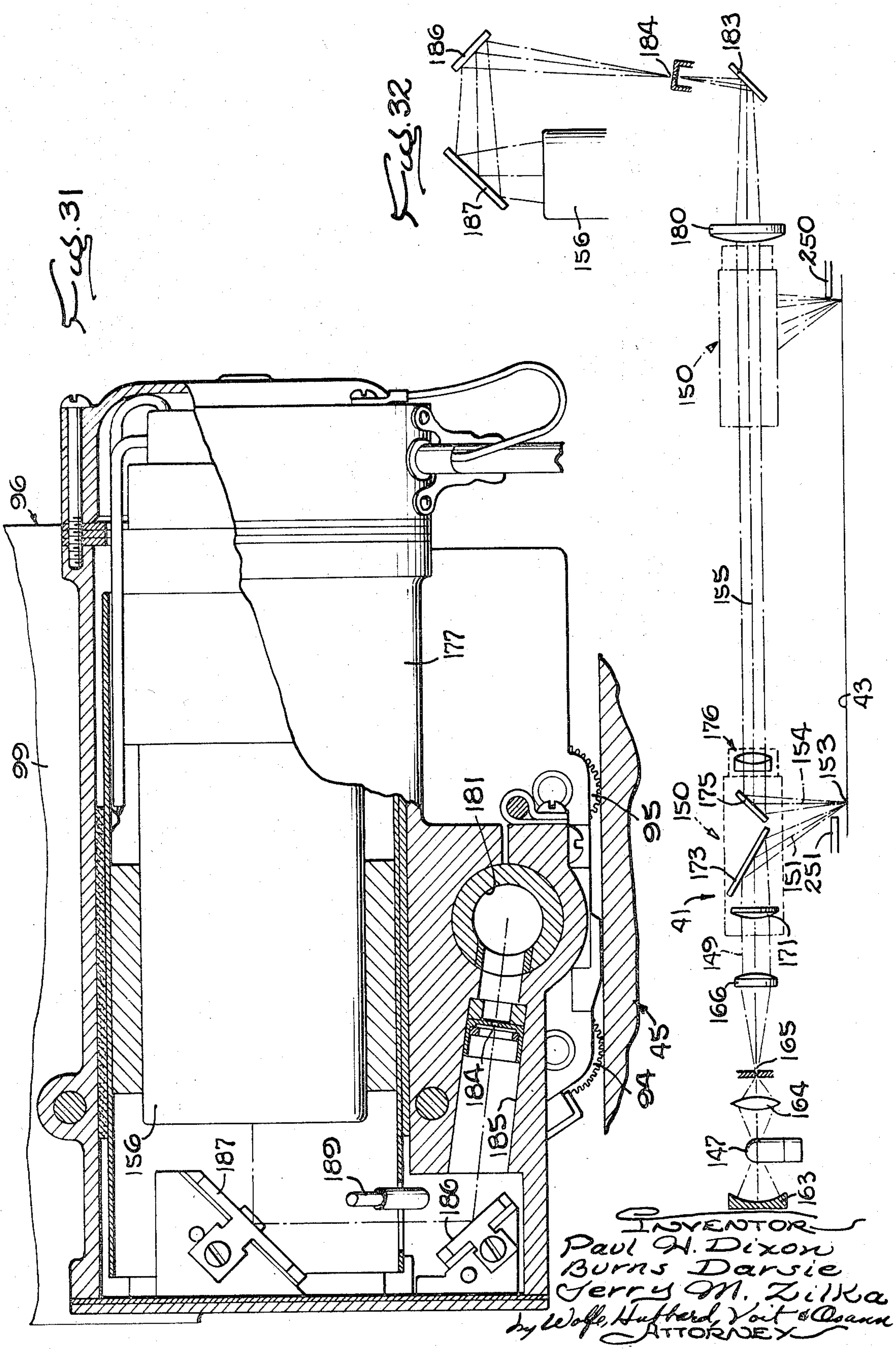
FIG. 31 is a fragmentary cross section taken substantially along the line 31–31 of FIG. 30.
FIG. 32 is a diagrammatic illustration of the path followed by the light beam as it is directed from the source onto the document by the scanner and then picked up and directed to the transducer.

As shown in FIGS. 30, 31 and 32, the light beam 155 from the scanner 150 is directed to the photomultiplier 156 through a hole 179 in the right end wall 99 of the head enclosure 96 and through a lens 180 located in a bore 181 formed in the casing 177 and aligned with the hole. The beam then is reflected from a mirror 183 in the bore and passes through an iris 184 having an opening with a diameter of .046 inches and disposed in a bore 185 opening into the bore 181. Thereafter, the light is reflected off of a mirror 186 to a mirror 187 and finally is directed to the photomultiplier. Since the lens 176 collimates the rays of the beam 155 as the latter leaves the scanner, the cross-sectional area of the beam received by the lens 180 and ultimately by the photomultiplier does not change as the scanner 150 moves across the document 43.

To compensate for any fluctuation in or deterioration of the intensity of the lamp 147, a bundle of optical fibers 189 (FIGS. 1 and 27) is connected to a tube 190 leading from the lamp housing 157 and is strung across the head 44 to the photomultiplier casing 177 to transmit some of the light emitted by the lamp directly to the photomultiplier 156. Appropriate electric circuitry (not shown) responds to the light transmitted through the optical fibers and acts to keep the electrical output of the photomultiplier correlated with the intensity of the light produced by the lamp. A valve 191 (FIG. 28) located between the tube and the fiber optics is formed with an aperture 193 which may be turned to various positions to regulate the light transmitted to the photomultiplier.

Summarizing briefly, the collimated light beam 149 directed from the lamp 147 to the scanner 150 is reflected downwardly onto the document 43 as the scanner moves from left to right across the document. With the spot 153 of light directed onto the document being of uniform size and intensity, the intensity of the light 154 reflected back upwardly to the scanner is precisely indicative of the shading of the document. Since the spot is quite small, only the printing along a narrow line equal in width to the diameter of the spot is scanned at any one time thus resulting in the average intensity of the reflected beam 155 being more truly representative of the shade value of the scanned line. Moreover, the intensity of the small spot does not vary by any appreciable amount from its center to its periphery. Being collimated, the beam 155 directed to the photomultiplier remains of uniform cross section as the scanner moves across the document and thus varies as a function of the shade value of the document without being affected by the physical position of the scanner. As an end result, the electrical signal created by the photomultiplier is more nearly representative of the pictures and printing appearing on the document so as to enable the recorder to produce sharp and distinctive facsimiles of uniformly high quality.

The invention also contemplates feeding the document beneath the scanning mechanism 41 with a continuous and uninterrupted motion for purposes of obtaining a faster and more uniform advance while, at the same time, continuously scanning the document line-by-line along closely spaced parallel lines to avoid unevenly skipping or overlapping any lines and to make the transmitter compatible with available recorders. For these purposes, the scanning mechanism includes a second scanner 200 (FIG. 14 and FIGS. 33 to 37) in addition to and identical with the scanner 150 with the two scanners being movable alternately through an active or scanning stroke across the document and being positionable alternately in the light beam 149 to direct the light onto the document 43 and then to transmit the reflected light to the photomultiplier 156. During the time the first scanner is positioned within the light beam 149 and is being moved from left to right across the document through its scanning stroke, the document is advanced continuously beneath the scanner through a distance of about .01 of an inch. At the same time, the second scanner is positioned out of the light beam 149 and is moved reversely or from right to left across the document through a return stroke preparatory to beginning a scanning stroke. As soon as the first scanner reaches the end of its scanning stroke, it is shifted out of the path of the light beam and begins reverse movement through a return stroke. Simultaneously, the second scanner is shifted into the path of the light beam and is moved from left to right through a scanning stroke to transmit to the photomultiplier the light reflected from the document. With the scanners thus being moved alternately through scanning strokes, the document is scanned continuously and precisely along closely spaced parallel lines so that the transmitter may be used with presently existing recorders and, in addition, the document may be fed continuously and at a rate which is relatively rapid when compared to that which would be possible if only one scanner were used.

Figure 9:
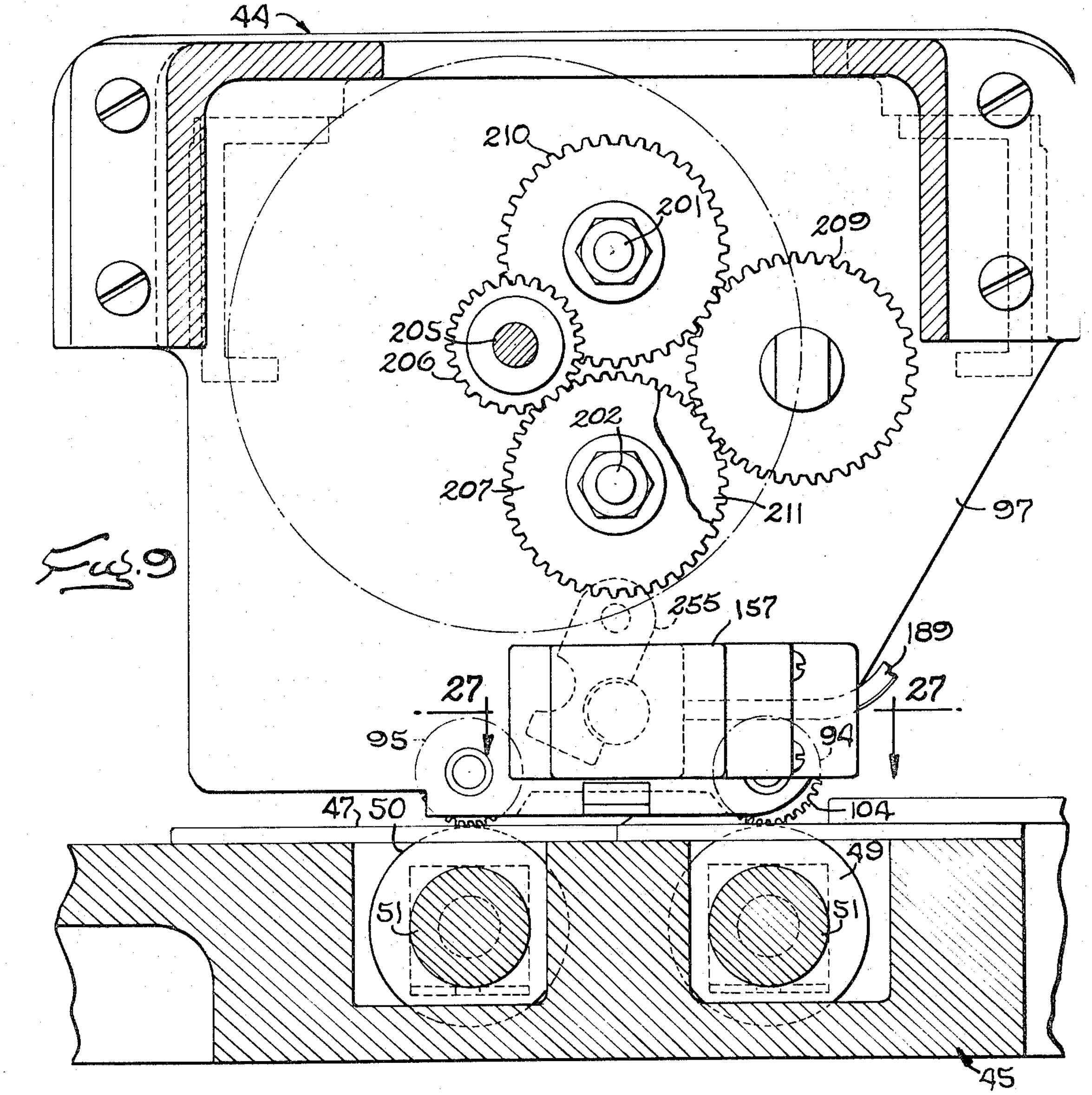
FIG. 9 is an enlarged fragmentary cross section taken substantially along the line 9–9 of FIG. 8.

More particularly, the scanners 150 and 200 are moved through their scanning and return strokes by an actuating mechanism comprising a pair of upper and lower rotatable screws 201 and 202 (FIGS. 14 and 18) formed with helical threads 203 and 204 and extending parallel to the light beam 149 between the end walls 97 and 99 of the head enclosure 96. The screws are rotated in timed relation with the feed rollers 49 and 50 by the electric motor 57 and thus movement of the scanner is synchronized with the advance of the document 43. To rotate the screws, a drive shaft 205 (FIGS. 6, 8 and 9) projecting from the end of the motor opposite the shaft 59 carries a pinion 206 which meshes with and rotates a gear 207 (FIG. 9) fast on the left end portion of the lower screw 202. The upper screw 201 is rotated in the same direction as the lower screw by an idler gear 209 meshing with a gear 210 on the upper screw and with a similar gear 211 fastened to the left end portion of the lower screw. Thus, operation of the motor causes rotation of the screws as well as the feed rollers. The drive of the recorder is synchronized with the movement of the scanners and the document through the use of a rotatable wheel 213 (FIGS. 7 and 8) mounted on the intermediate shaft 61 and formed with an aperture 214 adapted to register with a light beam directed toward a photoelectric device 215. The latter is carried on the head 44 adjacent the wheel and causes the transmission of an electrical pulse over the telephone wire each time the aperture registers with the light beam. Mechanism in the recorder detects the pulse and keeps the recorder operating at a rate synchronized with the movement of the scanners and the document.

The scanners 150 and 200 are supported on separate carriages 216 and 217 (FIG. 14), respectively, which are guided for back and forth movement along the screws 201 and 202 and crosswise of the direction of movement of the document 43. As shown most clearly in FIG. 14, the two carriages are disposed on opposite sides of the screws and are formed on their inboard sides with cylindrical sleeves 219 which are slidable along horizontal guide rods 220 spanning the end walls 97 and 99 of the head enclosure 96. Attached to the outboard side of each carriage is a guide element 221 formed with upper and lower jaws which slide along one flange of a channel member 223 fastened to the top wall of the enclosure 96. A vertically slidable antifriction button 224 is carried on the lower jaw of each guide element and is pressed against the channel by a cantilevered spring 225 fastened to the lower jaw and serving to prevent looseness between the guide element and the channel.

Each scanner 150, 200 is mounted on its respective carriage 216, 217 for movement from a scanning position disposed in the light beam 149 to an inactive position offset from the beam. In this instance, two arms 226 (FIG. 14) rigid with and upstanding from the housing 167 of each scanner are connected pivotally to the lower end of the carriage by a horizontal pin 227 which mounts the scanner for swinging between its positions. In its scanning position, each scanner is aligned vertically with the screws 201 and 202 and with the slot 101 in the holddown plate 100, and is located such that the light rays 151 reflected from the mirror 173 are directed downwardly onto the document to form the scanning spot 153 which then is reflected back upwardly and directed to the photomultiplier 156. Advantageously, the upper surface of a strip of the supporting anvil 55 underlying the slot and the document is coated with a white or reflective covering such that relatively transparent documents such as onionskin may be scanned without the background of the ultimate facsimile being darkened as a result of the light reflected from the anvil.

Figure 16:
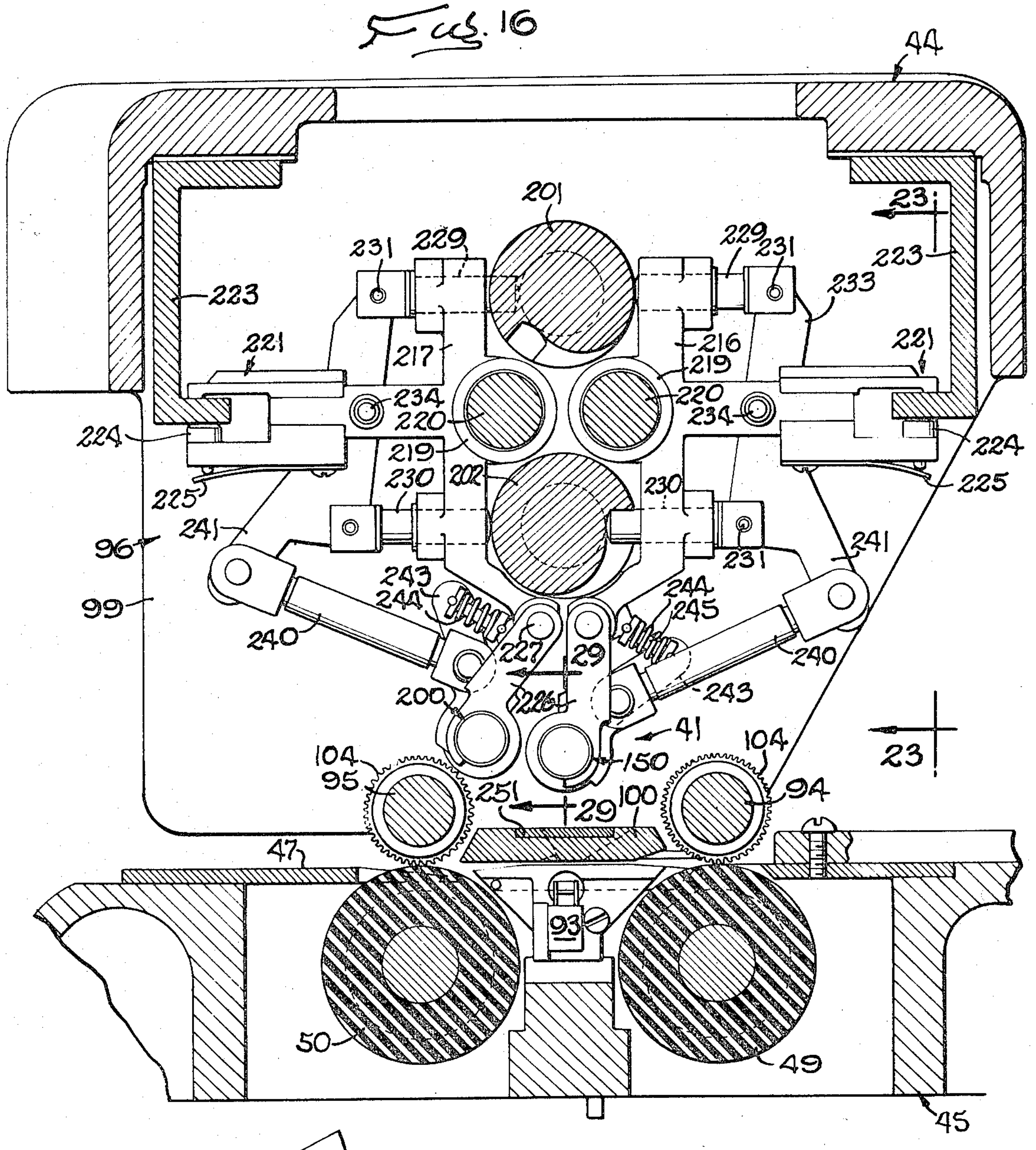
FIG. 16 is an enlarged fragmentary cross section taken substantially along the line 16–16 of FIG. 3.

Upon the completion of each scanning pass, one of the scanners 150, 200 moves to its inactive position to return reversely across the document 43 and the other scanner is swung to its scanning position to begin a forward scanning stroke. In moving to their inactive positions, the two scanners swing in opposite directions about the pivot pins 227. Thus, the scanner 150 is located on one side of the slot 101 (see FIG. 14) when the scanner 200 is overlying the slot and, conversely, the scanner 200 is located on the other side of the slot when the scanner 150 is located over the slot (see FIG. 16). The inactive scanner is offset from and disposed out of the path of the light beam 149 and thus does not affect the light being transmitted to the photomultiplier 156. In addition, the inactive scanner is positioned to clear the active scanner so that the two may move past one another as they are driven in opposite directions across the document.

Novel means are provided for driving the scanners 150, 200 in opposite directions across the document 43, for reversing each scanner automatically when it reaches the end of each of its strokes, and for swinging each scanner between its scanning and inactive positions as an incident to the scanner reversing directions. Herein, these means comprise driving connections in the form of two follower fingers 229 and 230 (FIG. 14) mounted on each carriage 216 and 217 and alternately moveable into driving engagement with the screws 201 and 202, respectively. The threads of the two screws are spiraled in opposite directions so that, with the finger 230 of the scanner 150 in engagement with the screw 202 and the finger 229 of the scanner 200 in engagement with the screw 201 (see FIG. 16), the two scanners are driven in opposite directions across the document as the screws are rotated in the same angular direction. One scanner reaches the end of its scanning stroke at the same time the other scanner reaches the end of its return stroke and, at this time, the condition of the driving fingers is reversed such that the finger 229 of the scanner 150 is shifted into driving engagement with the screw 201 and the finger 230 of the scanner 200 is shifted into driving engagement with the screw 202 (see FIG. 14). The two scanners thus reverse directions. In response to shifting of the fingers, the returning scanner is swung automatically to its scanning position and the scanner which just completed a scanning stroke is swung to its inactive position.

As shown in FIG. 14, the fingers 229 and 230 of each pair are disposed in vertically spaced relation alongside the screws 201 and 202 and are mounted slidably in the carriage 216, 217 for in and out movement toward and away from the screws. At their outboard ends, the fingers of each pair are pivotally connected as indicated at 231 to the ends of a lever 233 which is pivoted at its midpoint to the carriage by a pin 234. As the lever is rocked in one direction about the pin 234, the upper finger 229 is moved into driving engagement with the thread 203 of the screw 201 and the lower finger 230 is shifted away from the thread 204 of the screw 202. When the lever is rocked in the opposite direction, the lower finger 230 is shifted into driving engagement with the screw 202 and the upper finger 229 is shifted out of driving engagement with the screw 201.

The threads 203 and 204 of the screws 201 and 202 are sized to receive the pairs of fingers 229 and 230 and, as pointed out above, are spiraled in opposite directions with the thread on the screw 201 being right-handed and the thread on the screw 202 being left-handed. With the screws being rotated in a clockwise direction (FIG. 14), each scanner 150, 200 thus is driven from left to right across the document 43 through its scanning stroke when the finger 230 is in driving engagement with the lower screw 202 and is driven reversely across the document through its return stroke when the finger 229 is in driving engagement with the upper screw 201.

Figure 18:
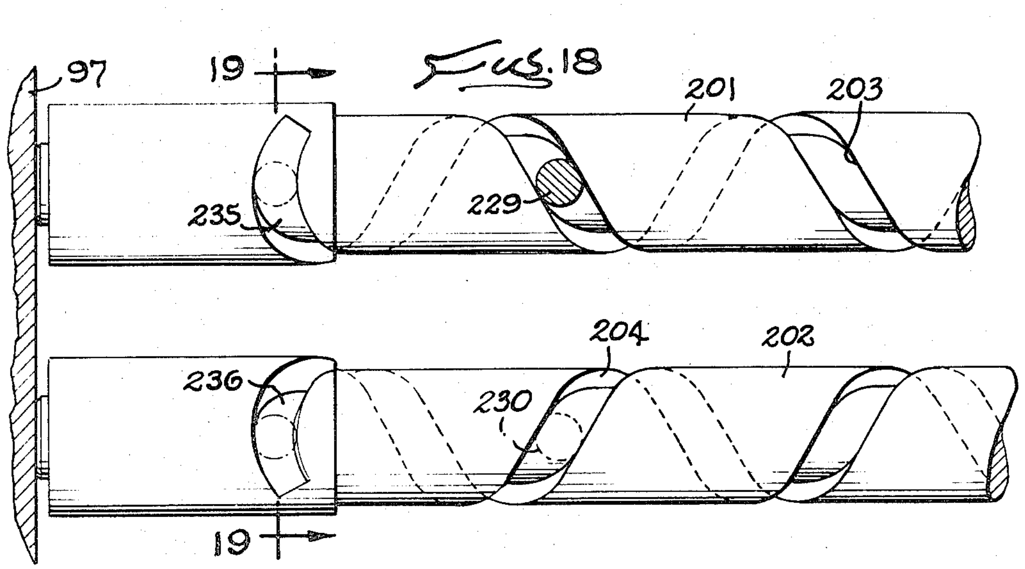
FIG. 18 is an enlarged plan view of one end of the scanner actuating mechanism shown in FIG. 1.
Figure 19:
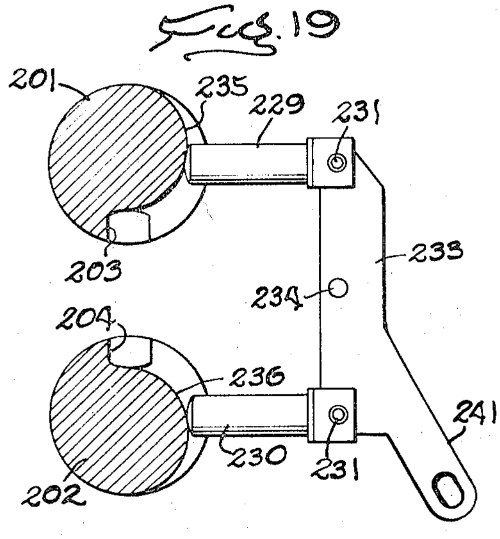
FIG. 19 is a fragmentary cross section taken substantially along the line 19–19 of FIG. 18.
Figure 20:
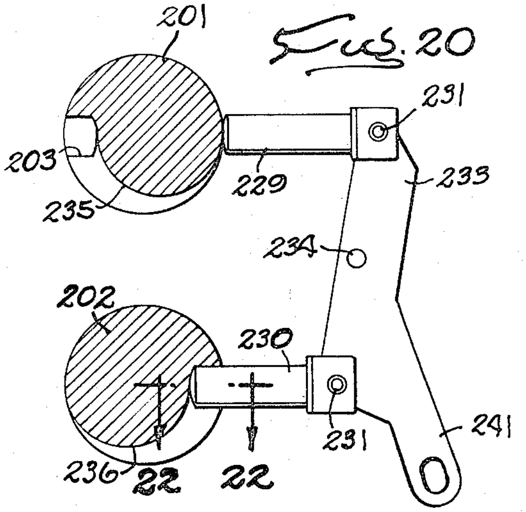
FIG. 20 is a view similar to FIG. 19 but showing the parts in moved positions.

To reverse the scanners 150 and 200 automatically when the latter reach the ends of each of their strokes, cam surfaces 235 to 238 (FIGS. 18 and 21) are formed on the ends of the screws 201, 202 to shift one finger 229, 230 of each pair out of driving engagement with the one of the screws 201, 202 and thus rock the levers 233 about the pins 234 and shift the other finger of each pair into driving engagement with the other of the screws. Herein, the cam surfaces are formed simply by gradually decreasing the depth of the threads near the ends of the screws such that, as the fingers approach the ends of the screws, the cam surfaces or roots of the threads shift one finger of each pair out of engagement with one screw while simultaneously permitting the other finger of the pair to move into engagement with the other screw. For example and as shown in FIGS. 19 and 20, cam surface 235 on the left end of the upper screw 201 engages and starts shifting the upper finger 229 of the carriage 216 outwardly as the scanner 150 approaches the left end of the screw upon completion of its return stroke. As the finger 229 shifts outwardly, the lower finger 230 shifts inwardly with the cam surface 236 limiting the rate of inward movement of the lower finger. With continued rotation of the two screws, the finger 229 is shifted completely out of driving engagement with the thread 203 and the finger 230 is shifted into full driving engagement with the thread 204. The direction of movement of the scanner 150 thus is reversed and the scanner starts moving from left to right through its scanning stroke. When the fingers approach the right ends of the screws, similar shifting occurs except that the cam surface 238 at the right end of the lower screw 202 shifts the lower finger 230 outwardly while the cam surface 237 on the right end of the upper screw 201 permits the upper finger 229 to move into driving engagement with such screw. Accordingly, the scanner 150 is again reversed automatically as soon as it completes its scanning stroke. The cam surfaces act in an identical manner on the fingers 229 and 230 of the carriage 217 and thus the scanner 200 is also reversed automatically each time it reaches the end of each of its strokes. The two carriages are positioned along the screws such that the scanner 150 reverses at the end of its scanning stroke at the same time the scanner 200 reverses the end of its return stroke, and vice versa, so that one scanner begins a scanning pass just as the other completes such a pass.

Figure 21:
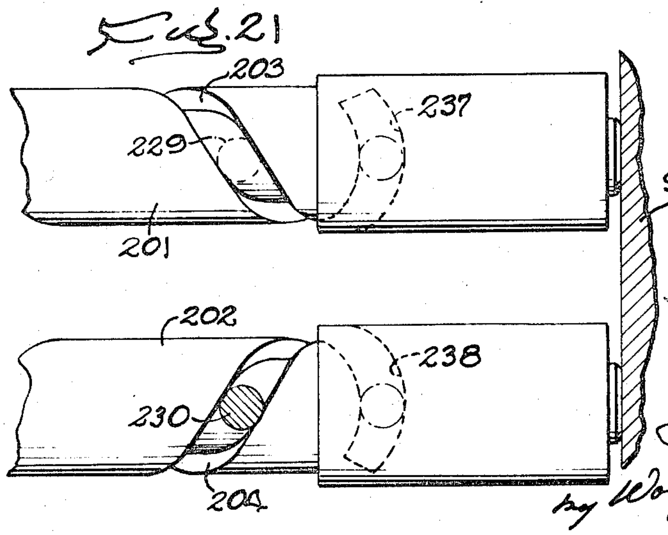
FIG. 21 is a fragmentary view similar to FIG. 18 but showing the other end of the scanner actuating mechanism.
Figure 22:
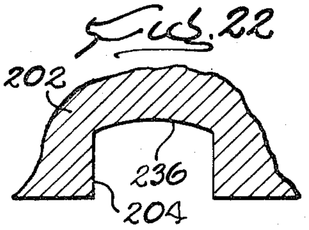
FIG. 22 is an enlarged fragmentary cross section taken substantially along the line 22–22 of FIG. 20.

In addition to shifting the fingers 229 and 230 into and out of driving engagement with the screws 201 and 202, the ends of the threads 203 and 204 are shaped to cause a gradual deceleration and acceleration of the scanners 150 and 200 as the latter approach the ends of their strokes, stop, and start through their reverse strokes and as the drive to the scanners is transferred from one finger to the other. As shown in FIGS. 18 and 21, the end convolution of each thread decreases in pitch and actually reverses directions so that each scanner decelerates until the fingers reach the positions shown, for example, in FIG. 19 in which the finger 229 has been shifted outwardly just far enough to transfer the drive to the finger 230. The scanner then stops for an instant and thereafter the finger 230 moves into sufficient engagement with the thread 204 (see FIG. 20) to reverse the scanner, the latter gradually accelerating as the finger 230 is accepted by the thread 204 and until the finger is moved away from the end portion of the thread.

In order to transfer the scanners 150, 200 between their scanning and inactive positions at the completion of each stroke, a coupling in the form of a link 240 (FIG. 16) is connected pivotally between an arm 241 on each lever 233 and an arm 243 located between the arms 226 and rigid with the housing 167 of each scanner. As each lever is rocked in a direction to place the finger 230 in driving engagement with the screw 202 and start the scanner through its scanning stroke, the link 240 swings the scanner about the pin 227 from its inactive position to its scanning position. When the lever is rocked in the opposite direction to place the upper finger 230 in driving engagement with the upper screw 201 and start the scanner through its return stroke, the link swings the scanner reversely from its scanning position to its inactive position. Accordingly, each scanner changes positions each time its direction of movement is reversed with one of the scanners being swung into the light beam 149 at the same time the other scanner is swung out of the beam. A coil spring 244 (FIG. 16) is telescoped over a plunger 245 connected pivotally between each arm 243 and the lower end of each carriage 216, 217 and snaps over center each time the scanner changes positions so as to bias the scanner yieldably in each of its positions. In addition, each spring acts through its associated link 240 and lever 233 to alternately press the driving fingers 229, 230 into yieldable engagement with its respective screw.

Figures 33, 34, 35, 36, 37:
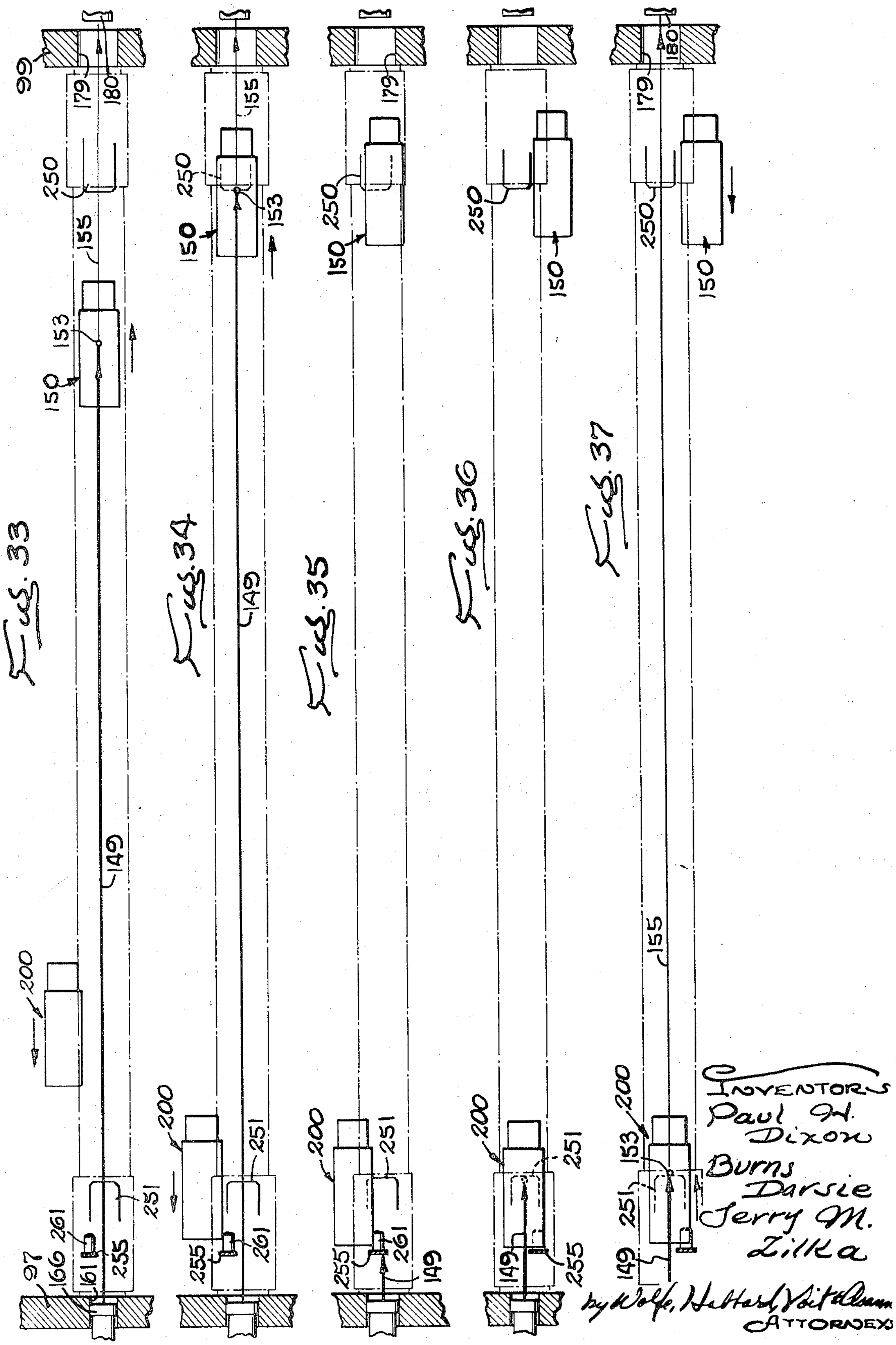
FIGS. 33 to 37 are step-by-step diagrammatic illustrations of the paths followed by the two scanners as they alternately move across the document.

The operation of the alternately active scanners 150 and 200 may be summarized best by reference to FIGS. 33 to 37. As shown in FIG. 33, the scanner 150, disposed in its scanning position in the path of the light beam 149, moves from left to right across the document 43 through its scanning stroke while the scanner 200 is returning from right to left in its inactive position and in a path offset laterally from the beam. During its scanning stroke, the scanner 150 directs the light beam 149 from the lamp 147 onto the document through the slot 101 in the holddown plate 100 and then directs the reflected beam 155 to the photomultiplier 156. The inactive scanner 200 does not affect the light in any way and simply returns idly to its starting position preparatory to beginning its scanning stroke.

When the scanner 150 approaches the end of its scanning stroke, the light beam 151 is directed against a shield 250 (shown schematically in FIGS. 32 and 35) located on the holddown plate 100 adjacent the right end of the slot 101 to prevent a distorted light signal from being transmitted to the photomultiplier 156 during the time the scanner is being switched to its inactive position. With continued left-to-right movement toward the end of its scanning stroke, the scanner 150 begins swinging laterally out of the light beam 149 and, at the same time, the scanner 200 reaches the end of its return stroke at the left end of the head enclosure 96 and starts swinging in the opposite direction into the light beam (see FIGS. 34 to 36). During the time the scanner 200 is being swung to its scanning position, any light reflected downwardly from the scanner is directed onto a second shield 251 (FIGS. 23 and 35) similar to the shield 250 but located at the left end of the slot 101.

As the scanner 200 swings to its scanning position, it starts moving from left to right through its scanning stroke and begins directing the light beam 149 onto the document 43 and then to the photomultiplier 156. At the same time, the scanner 150 reaches its inactive position and begins moving right to left through its return stroke. The operation thereafter is repetitive with one scanner being moved through its scanning stroke while the other scanner is being moved idly through its return stroke. Thus, with alternately operable scanners, the document is scanned continuously along parallel lines without any uneven skipping or overlapping and without any wasted time occurring as the scanners are returned. The transmitter thus is compatible with existing recorders and the document thus may be fed twice as fast as would be possible if only a single scanner were used and shifted through scanning and return strokes.

Figures 23, 24, 25, 26:
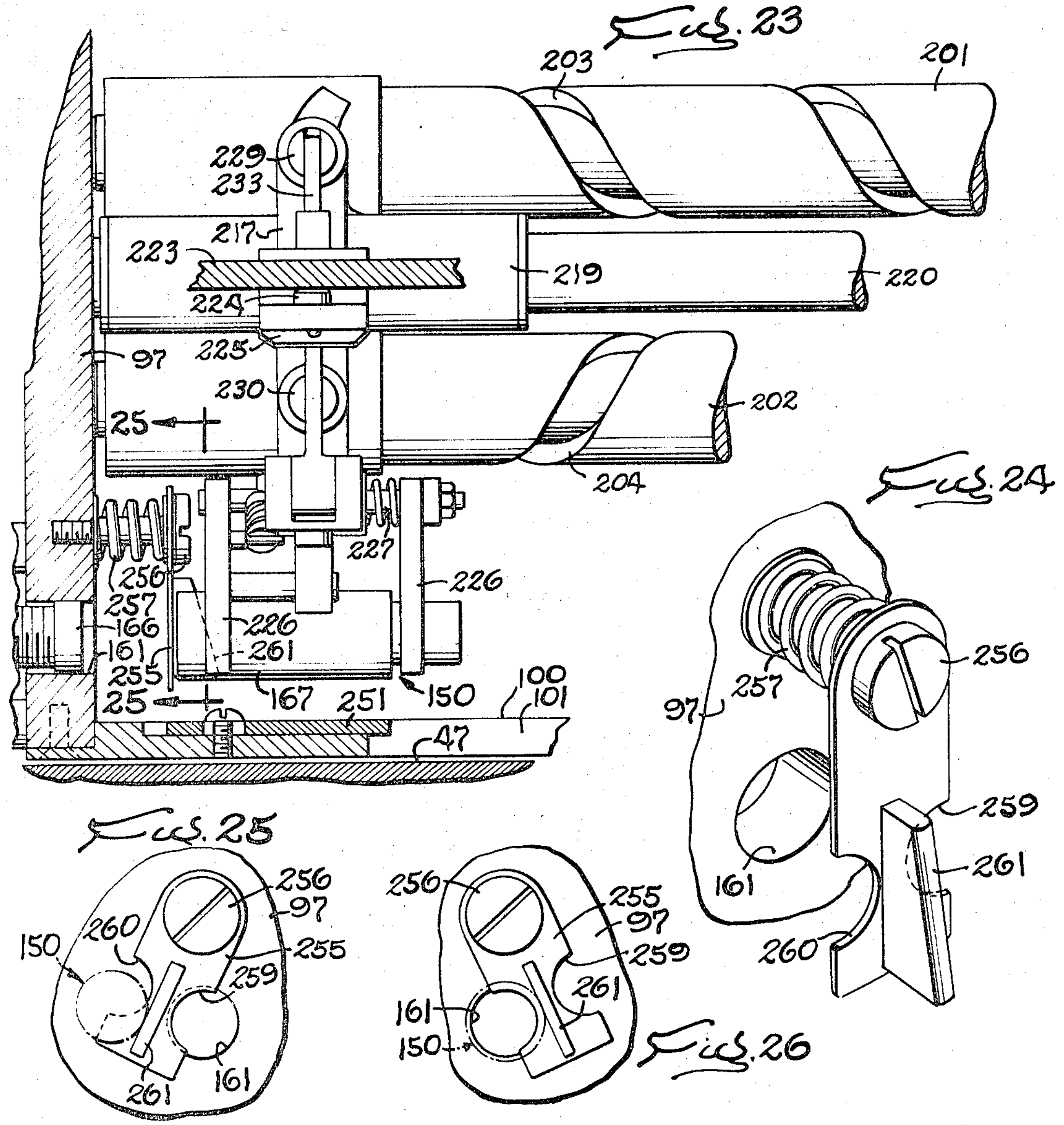
FIG. 23 is a fragmentary cross section taken substantially along the line 23–23 of FIG. 16 with certain parts broken away for purposes of clarity.
FIG. 24 is a fragmentary perspective view of parts shown in FIG. 23.
FIG. 25 is a fragmentary cross section taken substantially along the line 25–25 of FIG. 23.
FIG. 26 is a view similar to FIG. 25 but showing the parts in moved positions.

In order to prevent the photomultiplier 156 from being shocked by a high intensity light beam emitted directly from the lamp 147 when the scanners 150 and 200 are switched between their active and inactive positions, a shutter 255 (FIG. 24) is mounted on the inner side of the left end wall 97 of the head enclosure 96 and is adapted to swing across the path of the light beam 149 to block out part of the beam when the scanners change positions. As shown in FIG. 24, the shutter is mounted swingably on a screw 256 threaded into the end wall 97 and is urged against the head of the screw by a coil spring 257. The shutter is aligned generally with the hole 161 in the end wall and is formed along opposite side edges with semicircular openings 259 and 260 each having a radius slightly larger than that of the collimated light beam 149. Each time the scanner 200 reaches the end of its return stroke, it engages one side of a lug 261 on the shutter and swings the latter clockwise about the screw 256 from the position shown in FIG. 26 toward the position shown in FIG. 25. During such swinging, the web of the shutter located between the two openings 259 and 260 blocks out part of the light beam 149 emitted from the hole 161 as shown schematically in FIG. 35 and in effect closes the gap which is created momentarily between the two scanners as one swings into the light beam and the other swings out of the beam. As a result of the light being blocked out by the shutter, the beam 149 cannot pass directly to the photomultiplier 156 to shock the latter.

Upon the scanner 200 swinging to its full scanning position, the shutter 255 reaches the position shown in FIG. 25 in which the opening 259 aligns with the hole 161 to permit the beam 149 to be directed to the scanner and then onto the document 43. When the scanner 150 reaches the end of its return stroke and swings to its scanning position, it engages the other side of the lug 261 to swing the shutter counterclockwise across the light beam from the position shown in FIG. 25 to that shown in FIG. 26 thereby to block out the beam momentarily until the opening 260 becomes aligned with the hole 161. The swingable shutter thus prevents a high intensity light beam from striking directly against and shocking the photomultiplier 156 as the scanners switch positions.

We claim:

1. In a facsimile transmitter, the combination of, a base for supporting a document to be copied in a generally horizontal plane with the printing on the document facing upwardly, at least one feed roller journaled for rotation on said base beneath the document and frictionally engageable with the document to advance the latter continuously and at a predetermined rate, a head located above said base, a second roller rotatably journaled in said head and overlying and paralleling said one roller, means mounting said head on said base for up and down movement between a lowered position in which the second roller is in engagement with the document and a raised position in which the second roller is spaced upwardly from the document, and actuating mechanism coupled to said head and operable when actuated to move said head downwardly from said raised position to said lowered position, an overload device connected in said actuating mechanism and responsive to the application of pressure on the document by the second roller to stop further downward movement of said head in spite of continued actuation of said actuating mechanism, a light source carried on said head and aimed to direct a light beam along a predetermined path extending parallel to the document and crosswise of the direction of movement of the document, a pair of scanners carried on said head above the document and alternately positionable in said path, means carried by each scanner and operable when the latter is in said path to receive the light beam from said source and direct the light downwardly toward the document and to pick up the light reflected upwardly from the document and direct such light in a beam back along said path and away from said source, a light-to-signal transducer carried on said head and located near the end of said path opposite said source for receiving the light beam directed back along the path and for producing an electrical signal varying in accordance with changes in the intensity of such light beam, each of said scanners being mounted on said head for movement in one direction through a scanning stroke along said path and for reverse movement through a return stroke along a path offset from said one path, an actuating mechanism operable in timed relation with the advance of the document for moving one of said scanners through its scanning stroke along said one path and for simultaneously moving the other of said scanners through its return stroke along its offset path, and transfer means for shifting each scanner from one of its paths to the other of its paths each time the scanner reaches the end of each of its strokes whereby the document is scanned substantially continuously and the light beam is directed toward said transducer first by one of said scanners and then by the other of said scanners.

2. In a facsimile transmitter, the combination of, a base for supporting a document to be copied in a generally horizontal plane with the printing on the document facing upwardly, at least one feed roller journaled for rotation on said base beneath the document and frictionally engageable with the document to advance the latter, a head located above said base and carrying mechanism for scanning the document and producing a signal varying in accordance with changes in the shading of the document, a second roller rotatably journaled in said head and overlying and paralleling said one roller, means mounting said head on said base for up and down movement between a lowered position in which the second roller is in engagement with the document and a raised position in which the second roller is spaced upwardly from the document, an actuating mechanism coupled to said head and operable when actuated to move said head downwardly from said raised position to said lowered position, and an overload device connected in said actuating mechanism and responsive to the application of pressure on the document by the second roller to stop further downward movement of said head in spite of continued actuation of said actuating mechanism.

3. A facsimile transmitter as defined in claim 2 further including a number of axially spaced sets of fingers projecting radially from the periphery of said second roller with the fingers of each set being spaced from one another around the periphery of the second roller, said fingers being made of resiliently yieldable material and being capable of flexing toward and away from the periphery of the second roller independently of one another.

4. A facsimile transmitter as defined in claim 2 in which said means mounting said head comprises a parallelogram linkage connected pivotally between said head and said base to cause straight up and down movement of said head between said lowered and raised positions whereby such movement may occur without tilting of the head and the scanning mechanism.

5. A facsimile transmitter as defined in claim 4 further including mechanism connected to said head for counterbalancing the weight of the head.

6. A facsimile transmitter as defined in claim 5 in which said counterbalancing mechanism comprises an elongated torsion bar made of resiliently yieldable material and extending parallel to said rollers, one end of said torsion bar being secured to said head and the other end of said bar being secured to said base, and means for mounting one end of said bar for angular adjustment relative to the other end and for anchoring such one end in its adjusted position whereby said bar may be twisted longitudinally to apply a lifting force to said head.

7. A facsimile transmitter as defined in claim 6 in which said mounting means for said bar comprise a member carried by said other end of said bar, a second member anchored to said one end of said bar and rotatable relative to said first member, first and second series of angularly spaced holes in said first and second members with different ones of said first holes adapted to align with different ones of said second holes as said second member is turned to various angular position, and removable fasteners sized to project into said first and second holes to lock said first and second members to one another and hold said second member in its adjusted angular position.

8. A facsimile transmitter as defined in claim 7 in which the number of holes in said first series is unequal to the number of holes in said second series.

9. In a facsimile transmitter, the combination of, a frame for supporting a document to be copied, a scanner mounted on said frame for movement across the document and operable to produce a signal varying in accordance with the shading of the document, mechanism on the frame for feeding the document past the scanner, said mechanism including two elongated cylindrical rollers aligned substantially parallel to one another on opposite sides of the document with at least one of the rollers being power driven to advance the document, means biasing one of the rollers toward the other roller and into frictional engagement with the document with a preselected amount of pressure, and a number of axially spaced sets of fingers projecting radially from the periphery of one of the rollers with the fingers of each set being spaced from one another around the circumference of such roller, said fingers being made of resiliently yieldable material and being capable of flexing toward and away from the periphery of the roller independently of one another to accommodate any variations in the thickness of the document, any misalignment of the rollers and any application of unequal pressure along the length of the rollers.

10. A facsimile transmitter as defined in claim 9 in which the fingers of each set project radially and outwardly from an endless band of material sized to fit around said roller.

11. A facsimile transmitter as defined in claim 10 in which each band is fitted within a circumferential groove formed around the periphery of the roller and is sized so as to be capable of slipping relative to the roller to allow said fingers to brush past the document.

12 In a facsimile transmitter, the combination of, a frame for supporting a document to be copied, a scanner mounted on said frame and movable in a predetermined path across the document, a light source positioned near one end of said path and aimed to direct rays of light along said path toward said scanner, means located between said source and said scanner for collimating the light rays directed toward the scanner, a first reflector carried by said scanner for directing the light from said source laterally of said path and toward the document, a second reflector carried by said scanner for receiving the light reflected back from the document and directing such reflected light back along said path toward the other end thereof, a lens carried by and movable with said scanner in the path of reflection of said second reflector for collimating the reflected light directed back along said path, by said second reflector and a light-to-signal transducer located near the other end of said path for receiving the collimated reflected light and for producing an electrical signal varying in accordance with changes in the intensity of such light.

13. In a facsimile transmitter, the combination of, a frame having a surface for supporting a document to be copied, mechanism for feeding the document continuously across said surface at a preselected rate a light source aimed to direct light rays along a predetermined path extending parallel to the document and crosswise of the direction of movement of the document, a pair of scanners alternately positionable in said path, means carried by each scanner and operable when the latter is in said path to receive the light from said source and directed the light laterally toward the document and to pick up the light reflected from the document and direct such light back along said path and away from said source, a light-to-signal transducer located near the end of said path opposite said source for receiving the light directed back along the path and for producing an electrical signal varying in accordance with changes in the intensity of such light, each of said scanners being mounted on said frame for movement in one direction through a scanning stroke along said path and for reverse movement through a return stroke along a path offset from said one path, an actuating mechanism operable in timed relation with the advance of the document for moving one of said scanners through its scanning stroke along said one path and for simultaneously moving the other of said scanners through its return stroke along its offset path, and transfer means for shifting each scanner from one of its paths to the other of its paths each time the scanner reaches the end of each of its strokes whereby the document is scanned substantially continuously and the light is directed onto the document and toward said transducer first by one of said scanners and then by the other of said scanners.

14. A facsimile transmitter as defined in claim 13 further including means located along said one path adjacent said light source for collimating the light rays directed along said one path by the light source, and means carried by each of said scanners for collimating the reflected light directed back along said one path by the scanners.

15. A facsimile transmitter as defined in claim 13 in which each of said scanners includes a carriage guided on said frame for back and forth movement parallel to said one path, and said actuating mechanism comprising a rotatably driven screw mechanism extending parallel to said one path, and means connecting each of said carriages to said screw mechanism and operable to move each carriage first in one direction along said screw mechanism and then in the other direction along the screw mechanism in response to rotation of the latter.

16. A facsimile transmitter as defined in claim 15 in which each scanner is mounted on its respective carriage for shifting relative to the carriage from one path to the other path, said transfer means being engageable with and operable by said screw mechanism and being connected to said scanners to shift the latter on said carriages and between said paths as an incident to the carriages reversing directions along said screw mechanism.

17. A facsimile transmitter as defined in claim 15 in which one scanner is mounted on its carriage to swing in one direction from its scanning position to its inactive position and the other scanner is mounted on its carriage to swing in the opposite direction from its scanning position to its inactive position whereby the scanners move in different offset paths during their return strokes, and further including a shutter mounted on said frame for movement across and said one path to block at least part of the light momentarily and prevent the latter from being transmitted directly from said source to said transducer when said scanners switch positions, and means on one scanner for moving said shutter in one direction across said one path when such scanner switches positions upon reaching the end of one of its strokes, and means on the other scanner for moving said shutter in the opposite direction across said one path when the other such scanner switches positions upon reaching the corresponding end of its corresponding stroke.

18 In a scanning mechanism for a facsimile transmitter having a light source positioned to direct a light beam along a predetermined path, the combination of, a frame, first and second power rotated screws journaled in said frame and extending parallel to one another and the light beam, first and second carriages located on opposite sides of said screws and guided on said frame for independent back and forth movement in paths paralleling the screws, first and second optical scanners supported by and movable relative to said first and second carriages respectively, and movable in opposite directions from scanning positions disposed in the light beam to inactive positions located out of the light beam, first and second driving connections on each of said carriages and alternately movable into and out of driving engagement with the respective ones of said screws, the first driving connection on said first carriage being in driving engagement with the first screw when the second driving connection on the second carriage is in driving engagement with the second screw, and vice versa, whereby the carriages are moved in opposite directions along said screws through strokes of predetermined length in response to rotation of the screws, means near opposite ends of each screw for moving one driving connection of each carriage out of driving engagement with one screw and for moving the other driving connection of each carriage into driving engagement with the other screw each time the carriage reaches the end of its stroke thereby to reverse the direction of movement of each carriage, and a coupling between the driving connections and scanner on each carriage and responsive to movement of the driving connections into and out of driving engagement with the screws to move the scanner on such carriage between said scanning and inactive positions.

19. In a scanning mechanism for a facsimile transmitter having a light source aimed to direct a light beam along a predetermined path, the combination of, a frame, first and second power rotated screws journaled in said frame and extending parallel to one another and the light beam, a carriage located at one side of said screws and guided on said frame for back and forth movement in a path paralleling the screws, an optical scanner supported by said carriage and movable with the latter, first and second driving connections on said carriage and alternately movable into and out of engagement with the respective ones of said screws whereby the carriage is moved in one direction along the screws when one connection is in driving engagement and is moved in the opposite direction along the screws when the other connection is in driving engagement, means near one end of one screw for moving one of the driving connections out of driving engagement and for moving the other driving connection into driving engagement each time said carriage approaches said one end, and means near the other end of the other screw for moving said one driving connection into driving engagement and for moving the other driving connection out of driving engagement each time said carriage approaches said other end whereby the carriage is reversed automatically each time it approaches the ends of the screws.

20. A scanning mechanism as defined in claim 19 in which said scanner is mounted for movement relative to said carriage between a scanning position disposed in the light beam and an inactive position located out of the beam, and further including a coupling connected between said driving connections and said scanner and responsive to movement of one of said connections into driving engagement to move said scanner to said scanning position and responsive to movement of the other of said connections into driving engagement to move said scanner to said inactive position.

21. A scanning mechanism as defined in claim 19 in which said screws are rotated in the same direction and are formed with threads which are spiraled in opposite directions.

22. A scanning mechanism as defined in claim 20 in which each of said driving connections comprises a finger projecting into and riding along the thread of its respective screw when in driving engagement with the screw, a lever carrying said fingers and mounted pivotally on said carriage to rock about a predetermined axis, and said means near the ends of said screws comprising cam surfaces formed on the screws and each operable to cam one of the fingers out of driving engagement with one of the screw threads and to rock said lever about said axis to move the other of said fingers into driving engagement with the other of the screw threads, said lever being rocked in one direction as a result of one finger being cammed out of driving engagement and being rocked in the opposite direction as a result of the other finger being cammed out of driving engagement.

23. A scanning mechanism as defined in claim 22 in which said coupling is connected between said scanner and said lever and is operable to move the scanner to said scanning position when the lever is rocked in one direction and to move the scanner to said inactive position when said lever is rocked in the opposite direction.

24. A scanning mechanism as defined in claim 23 further including an overcenter spring acting on said scanner to hold the latter yieldably in both said active and said inactive positions.

25. A scanning mechanism as defined in claim 24 in which said spring acts through said coupling and said lever to hold said fingers yieldably in driving engagement with said screws.